United States Patent [19]
Morita et al.

[11] Patent Number: 5,844,670
[45] Date of Patent: Dec. 1, 1998

[54] METHOD OF AND SYSTEMS FOR MEASURING ECCENTRICITY OF AN ASPHERICAL LENS SURFACE

[75] Inventors: Nobuhiro Morita, Yokohama; Masayuki Takai, Sagamihara, both of Japan

[73] Assignee: Ricoh Co., Ltd., Japan

[21] Appl. No.: 681,822

[22] Filed: Jul. 29, 1996

[30] Foreign Application Priority Data

| Jul. 28, 1995 | [JP] | Japan | 7-193871 |
| Sep. 19, 1995 | [JP] | Japan | 7-240091 |
| Sep. 20, 1995 | [JP] | Japan | 7-241207 |
| Mar. 14, 1996 | [JP] | Japan | 8-057812 |
| Jun. 5, 1996 | [JP] | Japan | 8-142555 |

[51] Int. Cl.$^6$ .................................................. G01B 9/00
[52] U.S. Cl. ............................................ 356/124; 356/127
[58] Field of Search ............................... 356/124, 127

[56] References Cited

U.S. PATENT DOCUMENTS

| 4,767,215 | 8/1988 | Borodovsky | 356/124 |
| 4,779,979 | 10/1988 | Iwane | 356/127 |
| 4,818,108 | 4/1989 | Eppinger | 356/124 |
| 5,231,460 | 7/1993 | Kohayakawa | 356/127 |
| 5,349,433 | 9/1994 | Iwane | 356/127 |
| 5,548,396 | 8/1996 | Morita et al. | 356/127 |

FOREIGN PATENT DOCUMENTS

| 113342 | 7/1982 | Japan | 356/124 |
| 153540 | 7/1986 | Japan | 356/124 |
| 1-296132 | 11/1989 | Japan . | |
| 2-99841 | 4/1990 | Japan . | |
| 3-107739 | 5/1991 | Japan . | |

OTHER PUBLICATIONS

Article entitled "Theory and Practice of Lens Engineering" in *Optical Technology Contact,* vol. 20, No. 5 (1982) (In Japanese).

*Primary Examiner*—Frank G. Font
*Assistant Examiner*—Zandra V. Smith
*Attorney, Agent, or Firm*—Knoble & Yoshida LLC

[57] ABSTRACT

Accurate yet cost-effective measurement methods and systems determine eccentricity at a particular location of the aspherical lens surface. Since an aspherical lens generally has varying degrees of curvature along the aspherical surface, the eccentricity at the selected location on the aspherical lens surface provides precise information in determining the quality of a certain type of an aspherical lens component. Furthermore, these improved methods and systems according to the current invention are applicable to measure eccentricity of a selected aspherical lens surface in a complex lens assembly containing a plurality of aspherical lens components.

81 Claims, 18 Drawing Sheets

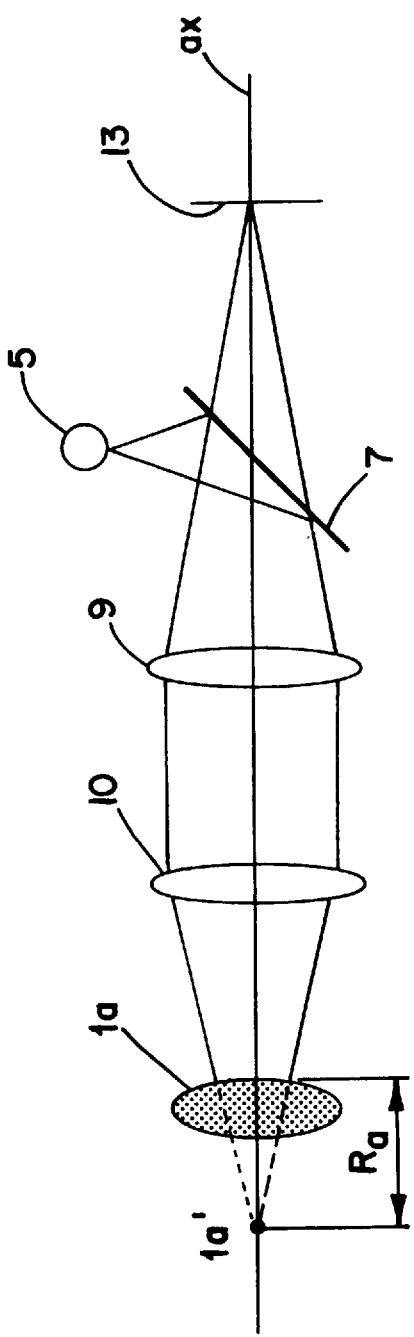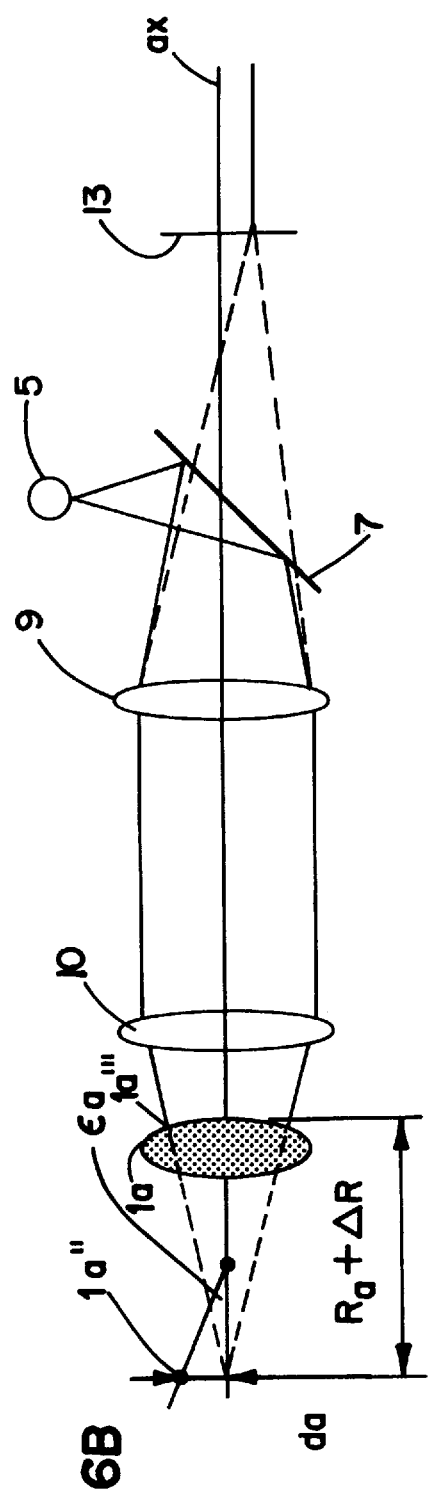
FIG. 4B
FIG. 6B

METHOD OF AND SYSTEMS FOR MEASURING ECCENTRICITY OF AN ASPHERICAL LENS SURFACE

FIELD OF THE INVENTION

The current invention is generally related to methods of and systems for measuring eccentricity of an aspherical lens, and more particularly related to methods of and systems for measuring eccentricity of a plurality of aspherical surfaces of a fixedly positioned lens assembly.

BACKGROUND OF THE INVENTION

An aspherical lens system has been widely used in optics for a number of advantages. In general, one of the advantages is that aspherical lens surfaces are relatively easy to manufacture. At the same time, the aspherical lens surfaces allow an optical system to be more compact than its counter part consisting of only spherical lens surfaces. Another advantage is that because aspherical lens surfaces can be designed according to a particular application or use, the aspherical lens systems generally deliver higher performance than its counter part.

Despite the above described advantages, it is generally more difficult to ascertain the precision of the manufactured aspherical lens surfaces. Undesirable variations are caused by many factors including mechanical as well as thermal inconsistencies during the manufacturing processes. To ascertain the quality of the manufactured aspherical lens, the lens surface shape is first examined. However, the lens surface shape is not sufficient to assure the precision. Additionally, the orientation or eccentricity of the aspherical lens surface with respect to its optical axis must be also evaluated to assure the quality of the aspherical lens. The eccentricity is also known as de-center of the aspherical lens in the relevant art of optics and is known to cause undesirable blurring of an image. Although the term eccentricity is a commonly known concept for evaluating the aspherical lens product, the definition of the eccentricity appears to vary slightly from one manufacturer to another.

The eccentricity is generally used to refer to an amount of shift or tilt of an aspherical lens. Referring to FIG. 1, a cross sectional view illustrates two aspherical lens surfaces c and d. Every aspherical lens has a substantially spherical portion b near its paraxial region. A center a of the substantially spherical region generally lies on the optical axis Z of the aspherical lens. Outside of the substantially spherical portion, the lens surface becomes aspherical, and the aspherical lens surface is generally expressed by a high-degree function. Conceptually speaking, a perfectly aspherical lens c has a lens optical axis Z which is aligned with its paraxis. In this case, there is no eccentricity. On the other hand, when an aspherical lens d is imperfectly manufactured so that the lens optical axis e does not lie on the paraxis, some eccentricity exists. One way to express the amount of eccentricity is the tilt or an angle f formed between the vertical paraxis and the lens optical axis e as shown in FIG. 1. Thus, roughly speaking, the eccentricity of an aspherical lens is tantamount to configurational asymmetry.

The measurement of the above described eccentricity is important for at least two reasons. One reason is to identify defective aspherical lens surfaces so that these undesirable lens components are not incorporated into a product. The defectiveness may be determined by comparing the measured eccentricity value to a predetermined threshold tolerance value. An equally important reason is to utilize the measured eccentricity value to correct its lens die for the future production of the improved aspherical lens. This use of the measured eccentricity is preventative and substantially improves the manufacturing cost of the aspherical lens components. These reasons have necessitated an accurate, efficient yet cost effective method of and system for measuring eccentricity of the aspherical lens.

One prior approach to measure the eccentricity involves a process of rotating an aspherical lens. The general principle of the rotation techniques is described in an article entitled "Theory and Practice of Lens Engineering" in Optical Technology Contact, Vol 20, No. 5 (1982). More recently, Japanese Patent 1-296132 discloses a method of measuring the eccentricity by detecting positional displacement of an aspherical lens surface during rotation via a displacement sensor. According to this approach, the detected displacement is translated into the eccentricity provided that an optical axis of the lens has been adjusted to align with a predetermined rotational axis of the holder. To accurately measure the displacement, the displacement sensor must be perpendicularly positioned to the aspherical surface. The perpendicular position of the displacement sensor is not always perfect. In fact, it is not possible to use this method for measuring the eccentricity of a convex lens since the displacement sensor cannot be vertically positioned with respect to the aspherical lens surface. Another severe limitation is that since the displacement sensor must be able to detect the change in distance between the sensor and the rotating aspherical lens surface, it is impossible to measure eccentricity of an aspherical lens surface located inside a lens assembly.

Another prior approach in measuring eccentricity includes an image rotation technique as disclosed in Japanese Patents 2-99841 and 3-107739. According to these disclosures, a point object is positioned on the optical axis of a lens assembly including an aspherical surface. A point image is formed through the selected aspherical lens surface, and the image is reflected back to an image rotator. The reflected point image is rotated while the lens assembly is stationary. The size of the rotated image is used to determine an amount of eccentricity in the selected aspherical lens surface. Since the spot image is formed through a substantially spherical portion in the paraxial region, the above measurement techniques are limited to determining eccentricity based upon the substantially spherical lens surface area.

The above described measurement techniques do not provide a solution for efficient, accurate yet cost-effective measurement methods of and systems for determining eccentricity of a particular location of the aspherical lens surface. Since an aspherical lens generally has varying degrees of curvature along the aspherical surface, the eccentricity at the selected location on the aspherical lens surface provides precise information in determining the quality of a certain type of an aspherical lens component. Furthermore, such improved methods and systems should be able to applied to a selected aspherical lens surface in a complex lens assembly containing a plurality of aspherical lens components.

SUMMARY OF THE INVENTION

To solve the above and other problems, according to one aspect of the current invention, a method of measuring eccentricity of an aspherical lens using an image-forming optical subsystem, the aspherical lens having a substantially spherical portion near a paraxial region and an aspherical portion, includes the steps of: a) placing the aspherical lens in a holder so that a first optical axis near the paraxial region of the aspherical lens is substantially in alignment with a predetermined central axis of the holder; b) forming a first image through the substantially spherical portion using the image-forming optical subsystem whose second optical axis substantially coincides with the first optical axis; c) storing a first set of coordinates of a center of the first image formed in the step b); and d) forming a second image through a predetermined position in the aspherical portion using the image-forming optical subsystem; e) storing a second set of coordinates of a center of the second image formed in the step d); and f) determining an amount of eccentricity of the aspherical lens based upon the first set and the second set of the coordinates stored in the steps c) and e).

According to a second aspect of the current invention, a method of measuring eccentricity of a plurality of aspherical lens surfaces in a lens assembly using an image-forming optical subsystem, each of the aspherical lens surfaces having a substantially spherical portion near a paraxial region and an aspherical region, includes the steps of: a) placing the lens assembly in a holder so that a first optical axis of a first aspherical lens surface is substantially in alignment with a predetermined central axis of the holder; b) adjusting the aspherical lens surface for aligning the first optical axis with a second optical axis of the image-forming optical subsystem; c) forming a first image through a first predetermined location of the aspherical portion of the first aspherical lens surface using the image-forming optical subsystem; d) storing a first set of coordinates of a center of the first image formed in the step c); e) forming a second image through a second predetermined location of the aspherical portion of the second aspherical lens surface using the image-forming optical subsystem; f) storing a second set of coordinates of a center of the second image formed in the step e); and g) determining first eccentricity of the first aspherical surface and second eccentricity of the second aspherical surface based upon the first set and the second set of the coordinates stored in the steps d) and f).

According to a third aspect of the current invention, a system for measuring eccentricity of an aspherical lens having a substantially spherical portion near a paraxial region and an aspherical portion, the aspherical lens having a first optical axis, includes: a lens holder having a predetermined central axis for positioning the aspherical lens so that the first optical axis of the aspherical lens is substantially in alignment with the predetermined central axis of the holder; an image-forming optical portion located near the lens holder for forming an image through the aspherical lens, the image-forming optical portion having a second optical axis and being positioned with respect to the lens holder so that the second optical axis substantially coincides with the first optical axis; an optical distance controller for controlling an optical distance between the lens holder and the image-forming optical portion, a first distance allowing the image-forming optical portion to form a first image through the substantially spherical portion, a second distance allowing the image-forming optical portion to form a second image through a predetermined position in the aspherical portion of the aspherical lens; and an image-analysis portion for storing information related to the first image and the second image and determining eccentricity of the aspherical lens based upon the stored information.

According to a fourth aspect of the current invention, a system for measuring eccentricity of a plurality of aspherical lens surfaces in a lens assembly using an image-forming optical subsystem, each of the aspherical lens surfaces having a substantially spherical portion near a paraxial region and an aspherical region, includes: a lens assembly holder having a predetermined central axis for placing the lens assembly in a holder so that a first optical axis of a first aspherical lens surface is substantially in alignment with the predetermined central axis of the holder; an image-forming optical portion located near the lens holder for forming an image through the aspherical lens, the image-forming optical portion having a second optical axis and being positioned with respect to the lens holder so that the second optical axis substantially coincides with the first optical axis; an optical distance controller for controlling an optical distance between the lens holder and the image-forming optical portion, a first distance allowing the image-forming optical portion to form a first image through a predetermined position in the aspherical portion of the first aspherical lens surface, a second distance allowing the image-forming optical portion to form a second image through a predetermined position in the aspherical portion of the second aspherical lens surface, a third distance allowing the image-forming optical portion to form a third image through the substantially spherical portion of the first aspherical lens surface; and an image-analysis portion operationally connected to the image-forming optical portion for receiving information related to the first image and the second image and determining eccentricity of the aspherical lens based upon the stored information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4B is a diagram illustrating positional relations among optical components including an aspherical lens surface without eccentricity in an image-forming optical subsystem at the initial optical position.

FIG. 6B is a diagram illustrating positional relations among optical components including an aspherical lens surface with eccentricity in an image-forming optical subsystem at the second optical position.

DETAILED DESCRIPTION OF THE PREFERRED EMBODIMENT(S)

Figure 2:
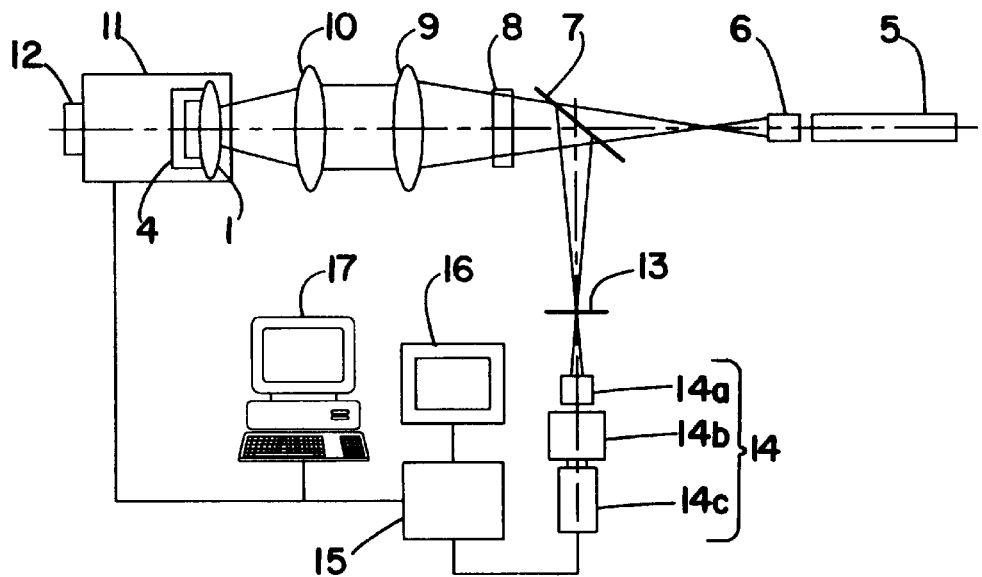
FIG. 2 is a block diagram illustrating one preferred embodiment of a system of measuring eccentricity at a precise location on an aspherical lens surface according to the current invention.

Referring now to the drawings, wherein like reference numerals designate corresponding structure throughout the views, and referring in particular to FIG. 2, one preferred embodiment of the aspherical lens surface eccentricity measurement system is illustrated in a block diagram according to the current invention. An aspherical lens 1 to be measured is placed at a lens holder 4. One embodiment of the lens holder 4 holds the aspherical lens 1 by vacuum suction and is slidably located on a stage 11. The position of the holder 4 on the stage 11 is determined by a linear scale controller 12. A personal computer 17 or a microprocessor is connected to the linear scale controller 12 which controls and/or reads the position of the holder 4 on the stage 11. The above components associated with positioning of the aspherical lens 1 are included in an optical distance controller subsystem according to one preferred embodiment.

The optical distance controller subsystem additionally includes software and data. For example, if the aspherical lens 1 to be examined has certain common characteristics such as the shape of the aspherical lens surface and the thickness of the lens, these information is stored in the CPU unit 17. To place the aspherical lens 1 at a predetermined position for evaluating its eccentricity, the processor unit 17 controls the positioning of the lens holder 4 via the software based upon the above described information. In an alternative embodiment, if the above described data is not constant among the aspherical lens components to be tested, the associated data is inputted via a keyboard or selected from the stored information.

Still referring to FIG. 2, one preferred embodiment of an irradiation optical subsystem includes a laser beam source 5, a condenser lens 6, a beam splitter 7, a ¼ wavelength plate 8 and lens components 9 and 10 towards the aspherical lens 1. The lens 9 projects the light rays in substantially parallel, and the object lens 10 converges the light rays as luminous flux towards the aspherical lens 1. Since the light reflected back from the aspherical lens 1 travels through the lens components 10 and 9 as well as the ¼ wavelength plate 8, the reflected light is polarized 90° from the original rays. The polarized light rays are thus reflected by the beam splitter 7 towards a reticule 13. In this regard, the lens components 10 and 9, the ¼ wavelength plate 8 and the beam splitter 7 are also part of an image-forming optical subsystem. The irradiation optical subsystem and the image-forming optical system share a common optical axis which also coincides with a predetermined central axis of the lens holder 4.

The reflected image formed by the above image-forming optical subsystem is analyzed by an image analysis subsystem which includes an image-forming output unit 14, an image-processing unit 15 and an monitor display unit 16. The reflected light rays forms an image at the reticule 13. The light rays of the image enter into a camera CCD or a photosensitive cell 14c through a microscope objective lens 14a and a camera lens 14b of the image-forming output unit 14. The camera 14c outputs to the image-analysis unit 15 an electrical signal representative of the formed image at the reticule 13. The image-analysis unit 15 determines a center of the formed image in a predetermined coordinate system and stores at least a pair of coordinates for the center. The formed image is optionally displayed on the monitor 16.

Based upon the coordinate data from the image-analysis unit 15 along with other information, an application program running on the computer 17 determines eccentricity of the aspherical lens in the lens holder 4. Although the image-processing unit 15 and the monitor 16 are separately provided from the general purpose CPU or microprocessor 17 in the above described preferred embodiment, in an alternative embodiment according to the current invention, software running on the personal computer 17 performs the processes for determining the coordinates of the formed image as well as the eccentricity of the aspherical lens 1.

Figure 3:
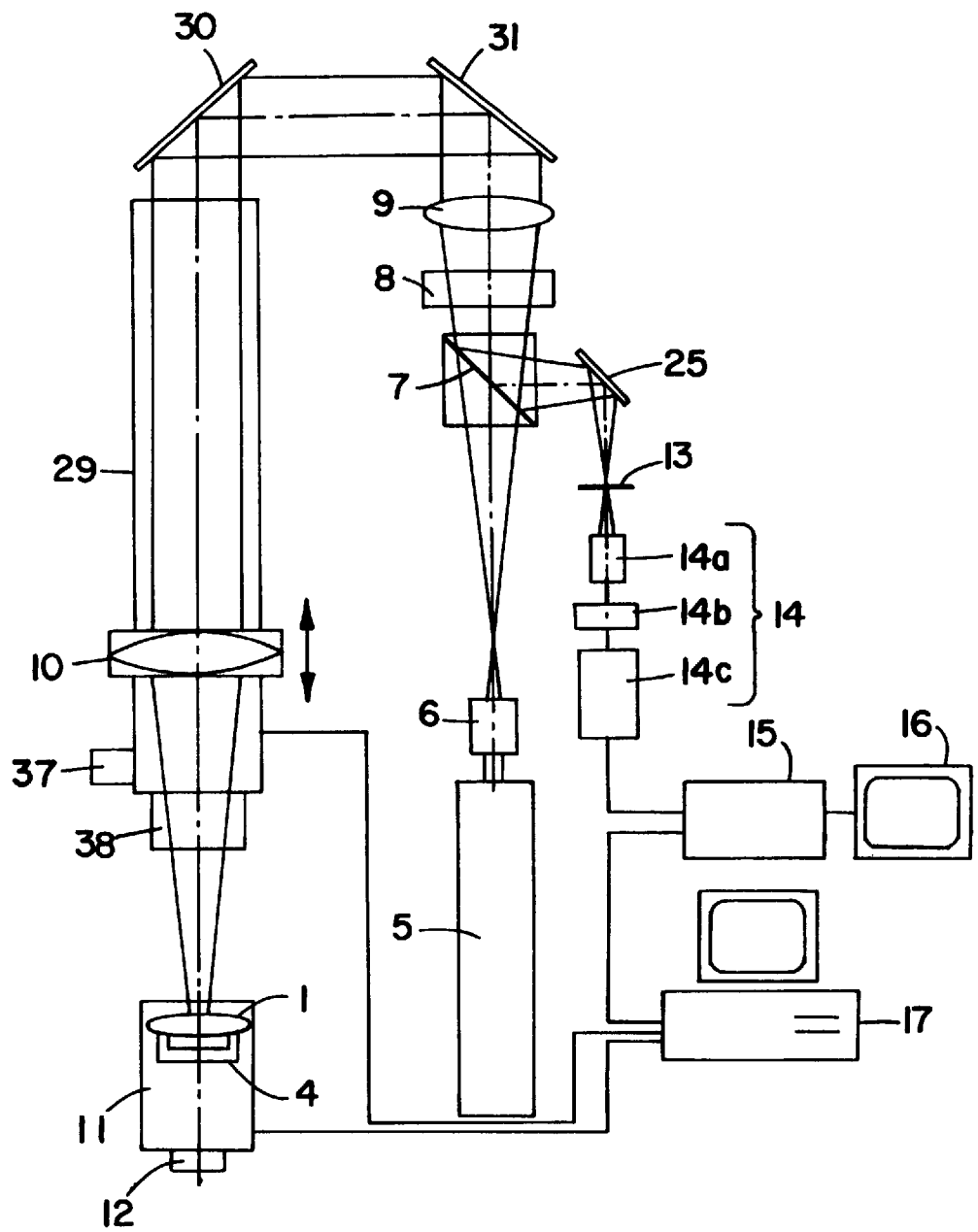
FIG. 3 is a block diagram illustrating a second preferred embodiment of a system of measuring eccentricity at a precise location on an aspherical lens surface according to the current invention.

Referring to FIG. 3, another preferred embodiment is illustrated according to the current invention. In general, the second embodiment is different from the first embodiment as described with respect to FIG. 2 in that the second embodiment is capable of positioning the object lens 10 at a desired location in parallel along the optical axis of the image-forming subsystem. The object lens 10 is slidably located in a housing 29. In response to the CPU 17, a predetermined initial position of the object lens 10 is established by an original position sensor 27, and the object lens 10 is moved towards a desired position by a stepping motor 28. These components are also considered as a part of the optical distance controller subsystem. Although additional mirrors 30, 31 and 25 are used in this embodiment, these components do not provide additional features other than to redirect the light rays to desired directions. Since the rest of the components in this embodiment are substantially identical in their structure and functions to the corresponding ones of the previously described preferred embodiment, the descriptions with respect to FIG. 2 are not reiterated but incorporated herein.

Figure 4A:
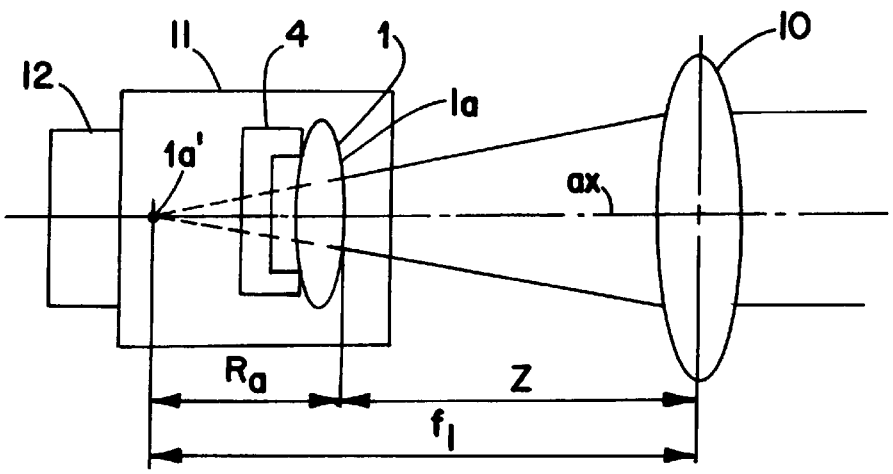
FIG. 4A is an enlarged cross sectional view of certain lens components at an initial optical position according to the current invention.

Referring to FIG. 4A, an enlarged cross-sectional view illustrates the structures along the luminous flux near the lens holder 4 at an initial lens mount position. The aspherical lens 1 has at least one aspherical lens surface 1a. In this initial aspherical lens mount position, the aspherical lens surface 1a is positioned proximal to the objective lens on the lens holder 4 in such a manner that the optical axis of the aspherical lens is substantially aligned with an optical axis ax of the objective lens 10. The aspherical lens 1 is also positioned at a distance Z from the object lens 10, and the objective lens has a focal length $f_1$. At this aspherical lens position at the distance Z from the objective lens 10, light rays enter a substantially spherical portion of the aspherical lens surface 1a near its paraxial region and are converged to a focal point 1a' of the objective lens 10 which also lies on a center 1a' of the curvature of the substantially spherical portion of the aspherical lens surface 1a' on the commonly shared optical axis ax. In other words, the radius of the substantially spherical portion is $R_a$. In summary, the positional relationship among the focal length $f_1$ of the objective lens, the distance Z between the aspherical lens surface and the objective lens and the radius of the substantially spherical portion Ra is expressed by the equation $f_1=Z+Ra$. This optical relation defines an initial optical position for measuring eccentricity of an aspherical lens.

Referring to FIG. 4B, the image-forming optical subsystem as illustrated in FIG. 4A is expanded to include an image formation portion. The incident light from a light source 5 is reflected back through the substantially spherical portion of the aspherical lens surface 1a, the object lens 10 and 9 towards the beam splitter 7. Since the reflected light is polarized, the reflected light travels through the beam splitter 7 to form a spot image substantially along the commonly shared optical axis on an image formation plane 33. The substantially spot image is formed regardless of the presence or absence of eccentricity in the aspherical lens since the light rays travel through the substantially spherical portion near the paraxis. According to one preferred embodiment, an image analysis subsystem determines a first set of coordinates $X_1$, $Y_1$ of the center of the image and stores them.

In order to ascertain that the focal point 1a' falls substantially on the optical axis ax, the aspherical lens position is optionally adjusted. One method of adjusting the alignment includes manually repositioning of the aspherical lens 1 on the lens holder 4 while monitoring the spot image on the image plane 13 or the monitor display. Another adjustment method includes automatic repositioning of the aspherical lens 1 by a motorized mechanical device placed on the holder in response to the command generated by the CPU 17 based upon the output from the image-analysis subsystem. After the adjustment, another preferred embodiment of the image analysis subsystem determines a first set of coordinates $X_1$, $Y_1$ of the center of the image and stores them.

Figure 1:
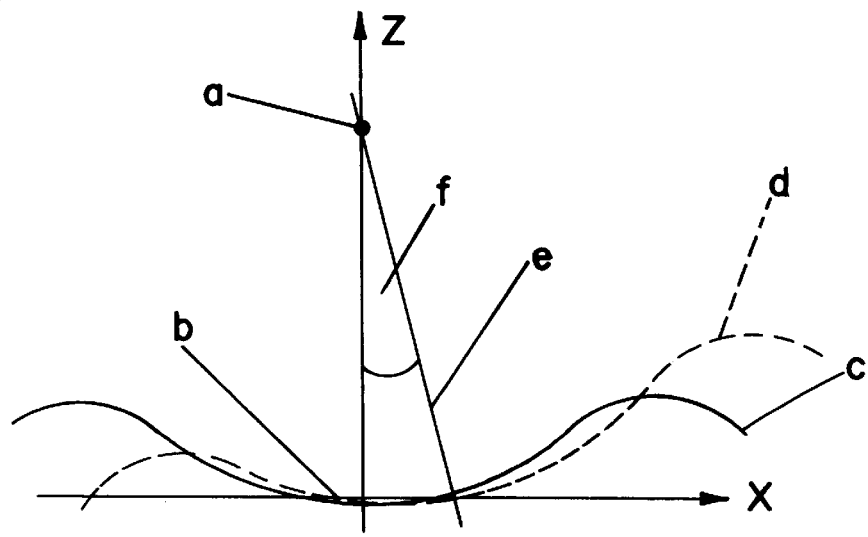
FIG. 1 illustrates a cross-sectional view of aspherical lens surfaces with and without eccentricity.
Figure 5B:
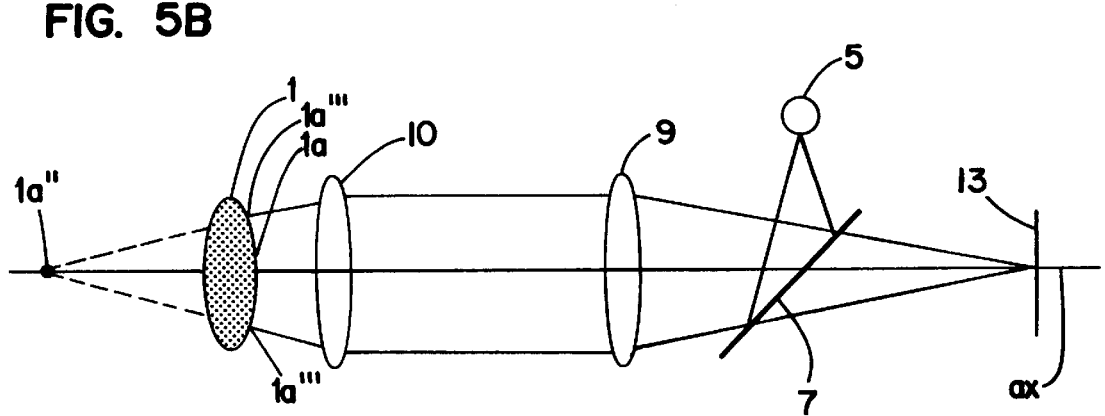
FIG. 5B is a diagram illustrating positional relations among optical components including an aspherical lens surface without eccentricity in an image-forming optical subsystem at the second optical position.
Figure 5A:
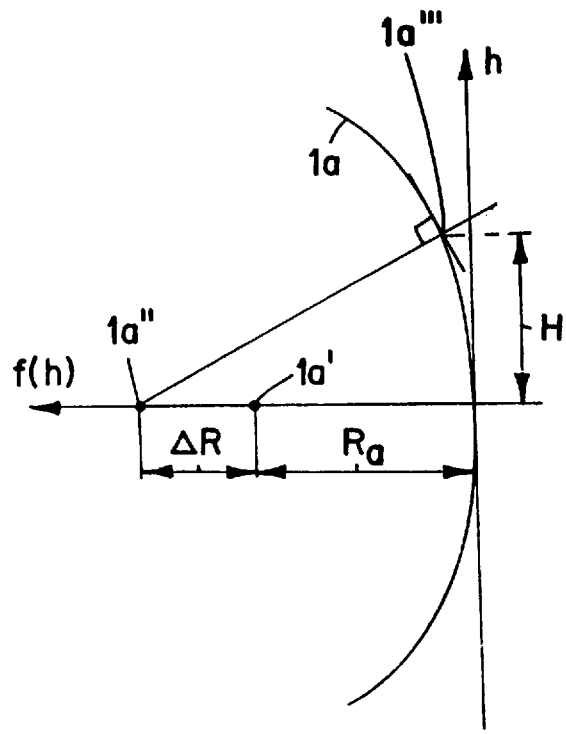
FIG. 5A is an enlarged cross sectional view of certain lens components at a second optical position according to the current invention.

After the above described initial optical position is ascertained, referring to FIG. 5A, an optical distance controller moves the focal point of the object lens 10 from the first center of the curvature 1a' of the substantially spherical region to a second center of curvature 1a" of a particular location 1a'" of the aspherical portion. The second center 1a" of the curvature is located ΔR from the first center 1a' of the curvature along the optical axis. The particular location 1a'" of the aspherical lens surface is identified by a function Z(h) which expresses the aspherical lens surface when a variable h has a particular value H. One example of the aspherical surface function is $Z(h)=(h^2/R^2)/[1+\sqrt{1-(K+1)(h^2/R^2)}]+Ah^4+Bh^6+Dh^8$. . . . A sufficiently large value of H is preferably selected to ascertain that the corresponding location 1a'" is clearly outside the substantially spherical portion and is located in the aspherical lens portion. The distance ΔR is determined by the following equation:

$$\Delta R = \{1/Z'(H)\}H + Z(H) - Ra$$

where $Z'(H)=dz(H)/dh$ and Ra is a radius of the substantially spherical region of the aspherical line. If the large H or ΔR value is not feasible for a particular aspherical lens measurement, the magnification factor of the objective lens may be adjusted to compensate for the small ΔR value.

Still referring to FIG. 5A, the above described optical relations define a second optical position for measuring eccentricity of an aspherical lens. Assuming that the aspherical lens surface 1a is substantially perfect and does not have any eccentricity, the light ray entering into the above specified particular location 1a'" passes through the center 1a" of the aspherical curvature. The same light ray is substantially perpendicular to a tangent line at the specified aspherical lens surface location $1a'''$.

Now referring to FIG. 5B, an extended diagrammatic view includes the image-forming optical subsystem at the second optical position. As assumed above, the aspherical lens surface 1a does not have any significant eccentricity. Furthermore, the optical axis of the aspherical lens 1 is also assumed to be substantially aligned with the optical axis of the image-irradiation optical subsystem. The light rays are reflected back from the center $1a''$ and through the specified location $1a'''$ on the aspherical lens surface as described with respect to FIG. 5A. The reflected rays further travel through the objective lens 10 and 9 as well as the beam splitter 7 to form a spot image on the image plane 13. In other words, even though the reflected rays travel through the aspherical portion, the spot image remains substantially the same when the spherical lens surface 1a does not have any eccentricity.

Figure 6A:
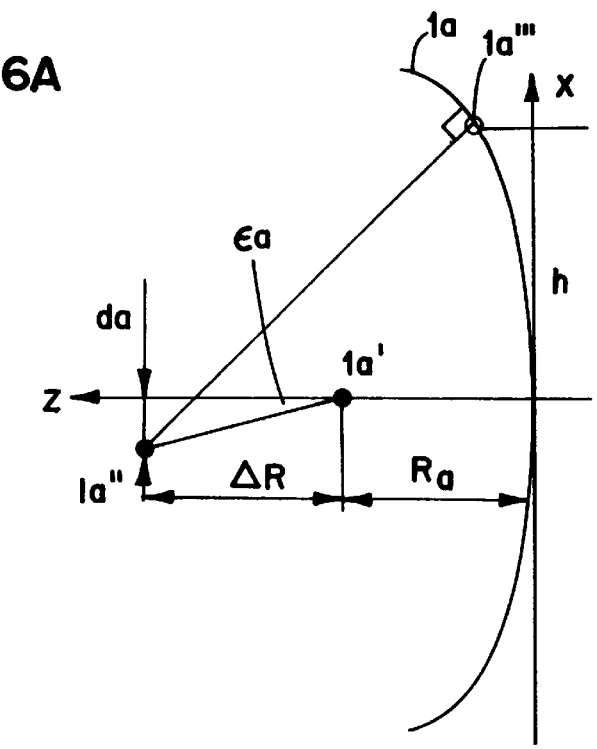
FIG. 6A is an enlarged cross sectional view of certain lens components at a second optical position according to the current invention.

In contrast to the above described perfect or no-eccentric aspherical lens, referring to FIG. 6A, the aspherical lens surface 1a now has some eccentricity. At the above described second optical position, due to the eccentricity of the aspherical lens, a light ray through the particular location $1a'''$ of the aspherical lens surface does not pass through the center $1a''$ of the curvature when the image-forming optical subsystem is in the second optical position. Because of the eccentricity, the light rays respectively passing through the particular location $1a'''$ and the center $1a'$ of the curvature near the paraxial region from an non-spot image da.

Now referring to FIG. 6B, an extended diagrammatic view includes the image-forming optical subsystem which forms an image through the spherical lens surface at 1a at the second optical position. As described above with respect to FIG. 6A, because of the eccentricity as detected through the aspherical lens surface location $1a'''$, at the second optical position, the image da is formed. The formed image da is reflected back towards an image plane 13, and the image downwardly extends from the optical axis of the image-forming optical subsystem. The image-analysis sub-unit determines the center of the formed image and stores the center coordinates as a second set of coordinates $X_2$, $Y_2$. In determining the center of the formed image, it is desirable that the formed image is sufficiently large for the accurate coordinates. The size of the image is proportional to an amount of eccentricity as well as the curvature of the specific location $1a'''$.

After taking the above described two sets of the coordinates $X_1$, $Y_1$ and $X_2$, $Y_2$ of the image respectively at the initial and second optical positions in the above described manner, referring back to FIGS. 2 and 4, the image-analysis unit 15 and the CPU 17 determine the eccentricity in the following steps. According to one preferred method of the current invention, a distance D between the two center coordinates is first determined based upon the following equation:

$$D = \sqrt{[\{X_2 - (R_0 - R_1 - t + \Delta R) \cdot X_1/(R_0 - R_1 - t)\}^2 + \{Y_2 - (R_0 - R_1 - t + \Delta R) \cdot Y_1/(R_0 - R_1 - t)\}^2]} \quad (1)$$

where $R_0$ is a radius of the substantially spherical portion of the aspherical lens surface 1a while $R_1$ is a radius of substantially spherical portion of the lens surface 1b opposite to the surface 1a, t is a thickness of the aspherical lens. The lens surface 1b may be or not be aspherical in this preferred method according to the current invention.

The above determined distance D is now used to determine the eccentricity of the aspherical lens surface 1a at the specified aspherical location. The eccentricity in a shift amount is defined as radian in minute, and the radian of the aspherical lens surface 1a as evaluated at the specific location is determined as follows:

$$\theta = \sin^{-1}\{(f_1 \cdot D \cdot \gamma)/2 \cdot f_2 \cdot \Delta R)\} \cdot 180 \cdot 60/\pi \quad (2)$$

where $f_1$ and $f_2$ are respectively a focal length of the first objective lens 10 and the second objective lens 9 as shown in FIG. 2, $\gamma$ is the size of a pixel in a CCD camera 14c as also shown in FIG. 2. Lastly, the direction of the above described eccentricity of the aspherical lens surface 1a is also determined as follows:

$$\phi = \tan^{-1}[\{Y_-(R_0 - R_1 - t + \Delta R) \cdot Y_1/(R_0 - R_1 - t)\}/\{X_2 - (R_0 - R_1 - t + \Delta R) \cdot X_1/(R_0 - R_1 - t)\}^2] \quad (3)$$

In determining the above defined eccentricity, certain information such as $f_2$, $f_2$, $\Delta R$, $\gamma$, $R_0$, $R_1$ and t for a particular aspherical lens is stored as predetermined data in the CPU unit 17 for the repetitive measurement of the aspherical lens component of the same characteristics. However, the system allows an operator to input the above information for various lens types on the fly during the measurement or to select from the predetermined sets of the information.

Based upon the above obtained eccentricity values, the aspherical lens surface is evaluated. One preferred method according the current invention determines whether a particular aspherical lens component is within a predetermined tolerance range of eccentricity. For this type of pass or fail evaluation, only the above defined shift amount or radian is necessary, and it is compared to a predetermined tolerance ranging from 1 to 3 minutes in one preferred method. On the other hand, another preferred method determines the correction data for a die to mold the certain aspherical lens. For this type of determination, both the shift amount and the tilt amount of the eccentricity are required.

During the above described preferred process of determining eccentricity of an aspherical lens surface, the optical axises of the light irradiation optical subsystem, the image-forming optical subsystem and the aspherical lens are assumed to be substantially aligned at the initial and second optical positions. Regardless of a method to achieve these optical positions, the above assumed alignment is not likely to be perfect. For example, referring back to FIG. 3, although an alternative embodiment moves the objective lens 10 along the optical axis, the movement of the object lens 10 is not perfectly parallel along the optical axis due to mechanical limitations of the lens moving unit.

Figure 7:
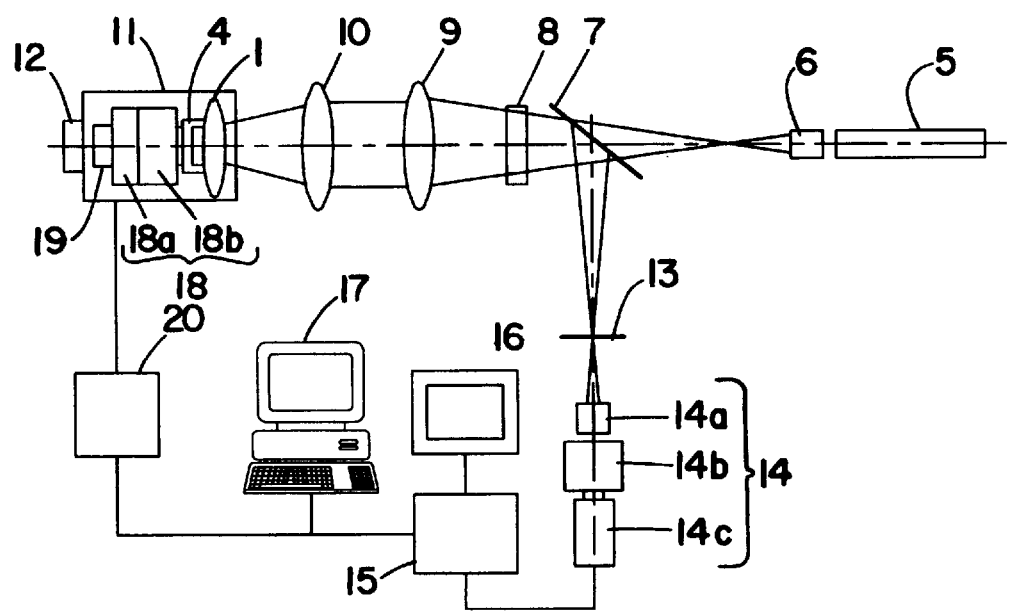
FIG. 7 is a block diagram illustrating another preferred embodiment of a system of measuring eccentricity at a precise location on an aspherical lens surface with a rotating unit according to the current invention.

Referring to FIG. 7, to compensate for the above described sources of error in eccentricity measurement, an alternative embodiment according to the current invention additionally includes a rotational unit 18 for rotating the lens holder 4 around the optical axis. The rotational unit 18 rotates the mounted aspherical lens 1 to a predetermined set of angles in response to a signal sequentially generated by a driver 20 which in turn is controlled by a CPU unit 17 and an image-analysis unit 15. The rotational unit 18 includes an air spindle 18b and a stepping motor 18a for rotating the aspherical lens to predetermined precise angles. At each angle, a rotary encoder 19 outputs a signal indicative of the angular position to the CPU unit 17 to ascertain the angle.

Using the above described alternative embodiment with a rotational subsystem, a series of the coordinates is taken for minimizing the error in the eccentricity measurements. According to one preferred method, at the initial optical position, as the aspherical lens is rotated over 360°, a pair of center coordinates $X_{1i}$, and $Y_{1i}$ is determined for an image formed at each of n predetermined angles where i indicates a specific one of the angles and ranges from 0 to n−1. Similarly, after the lens is moved to the second optical position, as the aspherical lens is rotated over 360°, a pair of center coordinates $X_{2i}$, and $Y_{2i}$ is determined for the image formed at each of the same n predetermined angles where i indicates a specific one of the angles and ranges from 0 to n−1. These coordinates are stored for the following analyses.

The above stored information is first averaged for each of the two optical positions. For the initial optical position, a pair of average values $X_{C1}$ and $Y_{C1}$ is determined as follows:

$$X_{C1}=(\Sigma X_{1i})/n, Y_{C1}=(\Sigma Y_{1i})/n$$

where i ranges from 0 to n−1. Similarly, for the second optical position, a pair of average values $X_{C2}$ and $Y_{C2}$ is determined as follows:

$$X_{C2}=)\Sigma X_{2i})/n, Y_{C2}=(\Sigma Y_{2i})/n$$

where i ranges from 0 to n−1.

Based upon the above determined average values, the following image analysis is further performed for determining a corrected eccentricity value. The distance T between the two centers is next obtained as follows:

$$T = \Sigma \sqrt{\begin{aligned}&[\{(X_{2i}-X_{C2})-(R_0-R_1-t+\Delta R)\cdot\\&(X_{1i}-X_{C1})/(R_0-R_1-t)\}^2+\\&\{(Y_{2i}-Y_{C2})-(R_0-R_1-t+\Delta R)\cdot\\&(Y_{1i}-Y_{Ci})/(R_0-R_1-t)\}^2]\end{aligned}}$$

where i ranges from 0 to n−1. $R_0$ is a first radius of the substantially spherical portion of the aspherical lens surface whose eccentricity is to be determined while $R_1$ is a second radius of the substantially spherical portion opposite to the aspherical lens surface. t is a thickness of the aspherical lens. The above obtained value T is substituted in the above equation (1) in place of D as shown below to obtain eccentricity in a corrected shift amount radian θ′:

$$\theta'=\sin^{-1}\{(f_1\cdot T\cdot\gamma)/2\cdot f_2\cdot\Delta R)\}\cdot 180\cdot 60/\pi\cdot$$

On the other hand, eccentricity in a corrected tilt amount ϕ′ is determined by the following relation:

$$\begin{aligned}\phi' = &(1/n)\Sigma\tan^{-1}[\{(Y_{2i}-Y_{C2})-(R_0-R_1-t+\Delta R)\cdot\\&(Y_{1i}-Y_{C1})/(R_0-R_1-t)\}/\\&\{(X_{2i}-X_{C2})-(R_0-R_1-t+\Delta R)\cdot\\&(X_{1i}-X_{C1})/(R_0-R_1-t)\}]\end{aligned} \quad (4)$$

Thus, the above corrective eccentricity measurement analysis compensates for errors caused by the misalignment of the optical axis between the image-forming subsystem and the aspherical lens to be evaluated.

Figure 8:
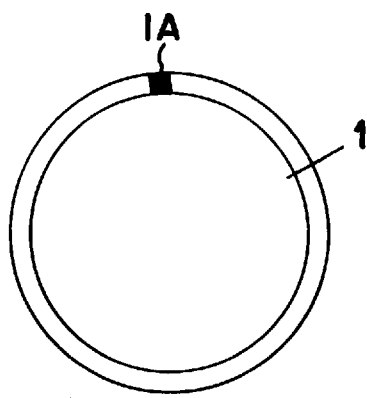
FIG. 8 illustrates an aspherical lens with a mark to be examined for its eccentricity according to the current invention.

According to another corrective method, eccentricity measurement errors caused by misalignment between the predetermined central axis of the lens holder and the image-forming optical subsystem are corrected. Referring to FIG. 8, one edge section of the aspherical lens 1 is marked. This mark is either visible or invisible, but it indicates a particular position to the image-analysis subsystem. At the first optical position, the mark is first positioned to a predetermined starting angle, and then as the aspherical lens is rotated over 360°, a pair of center coordinates $X'_{1i}$, and $Y'_{1i}$ is determined for an image formed at each of n predetermined angles where i indicates a specific one of the angles and ranges from 0 to n−1. Still at the initial optical position, after the marked position is rotated 180° from the predetermined starting angle, another pair of center coordinates $X''_{1i}$, and $Y''_{1i}$ is determined for an image formed at each of n predetermined angles where i indicates a specific one of the angles and ranges from 0 to n−1. Similarly, after the lens is moved to the second optical position, the mark is first positioned to a predetermined starting angle, and then a third pair of center coordinates $X'_{2i}$, and $Y'_{2i}$ is determined for the image formed at each of the same n predetermined angles where i indicates a specific one of the angles and ranges from 0 to n−1. Then, still at the second optical position, after the marked position is rotated 180° from the predetermined starting angle, a fourth pair of center coordinates $X''_{2i}$, and $Y''_{2i}$ is determined for the image formed at each of n predetermined angles where i indicates a specific one of the angles and ranges from 0 to n−1. These coordinates are stored for the following analyses.

Based upon the above stored information, the following steps of obtaining corrected eccentricity values are performed in the alternative corrective method according to the current invention. The first step is to determine $X_{1i}$, $Y_{1i}$, $X_{2i}$ and $Y_{2i}$ from the above stored information as follows:

$$X_{1i}=(X'_{1i}=X''_{1i})/2 \text{ and}$$

$$Y_{1i}=(Y'_{1i}=Y''_{1i})/2$$

$$X_{2i}=(X'_{2i}=X''_{2i})/2$$

$$Y_{2i}=(Y'_{2i}=Y''_{2i})/2$$

$$X_{C1}=(\Sigma X_{1i})/n$$

$$X_{C2}=(\Sigma X_{2i})/n$$

$$Y_{C1}=(\Sigma Y_{1i})/n$$

$$Y_{C2}=(\Sigma Y_{2i})/n$$

for every i from 0 to n−1. The second step is to determine a distance T between $(X_{1i}, Y_{1i})$ and $(X_{2i}, Y_{2i})$ based the following relation:

$$T = \Sigma \sqrt{\begin{aligned}&[\{(X_{2i}-X_{C2})-(R_0-R_1-t+\Delta R)\cdot\\&(X_{1i}-X_{C1})/(R_0-R_1-t)\}^2+\\&\{(Y_{2i}-Y_{C2})-(R_0-R_1-t+\Delta R)\cdot\\&(Y_{1i}-Y_{Ci})/(R_0-R_1-t)\}^2]\end{aligned}}$$

where i ranges from 0 to n−1. $R_0$ is a first radius of the substantial aspherical portion of the aspherical lens surface whose eccentricity is to be determined while $R_1$ is a second radius of the substantial aspherical portion opposite to the aspherical lens surface. t is a thickness of the aspherical lens.

The above obtained value T is substituted in the above equation (1) in place of D as shown below to obtain eccentricity in a corrected shift amount radian θ″:

$$\theta''=\sin^{-1}\{(f_1\cdot T\cdot\gamma)/2\cdot f_2\cdot\Delta R)\}\cdot 180\cdot 60/\pi$$

On the other hand, eccentricity in a corrected tilt amount ϕ″ is determined by the following relation:

$$\phi'' = (1/n)\Sigma \tan^{-1}[\{(Y_{2i} - Y_{C2}) - (R_0 - R_1 - t + \Delta R) \cdot$$
$$(Y_{1i} - Y_{C1})/(R_0 - R_1 - t)\}/$$
$$\{(X_{2i} - X_{C2}) - (R_0 - R_1 - t + \Delta R) \cdot$$
$$(X_{1i} - X_{C1})/(R_0 - R_1 - t)\}]$$

The above corrected tilt amount is further analyzed according to an alternative method. Assuming that the rotational radius of an aspherical lens surface affected by eccentricity of the aspherical lens is $T_1$. In addition, the rotational radium of the aspherical lens surface affected by the misalignment between the central axis of the holder and the optical axis of the image-forming subsystem is assumed to be $T_2$. Furthermore, the initial topology of the optical axis of the aspherical lens with respect to the central axis of the holder is assumed to be $\phi_1$ while the initial topology of the central axis of the holder with respect to the optical axis of the image-forming optical subsystem is assumed to be $\phi_2$. In terms of the above assumption, the above first and third center coordinates are expressed as:

$$X' = T_1 \cdot \cos\{(2\pi i/n) + \phi_1\} + T_1 \cdot \cos\{(2\pi i/n) + \phi_2\} \quad (5)$$

$$Y' = T_1 \cdot \sin\{(2\pi i/n) + \phi_1\} + T_1 \cdot \sin\{(2\pi i/n) + \phi_2\} \quad (6)$$

Similarly, the above second and fourth center coordinates are expressed as:

$$X'' = -T_1 \cdot \cos\{(2\pi i/n) + \phi_1\} + T_1 \cdot \cos\{(2\pi i/n) + \phi_2\} \quad (5A)$$

$$Y'' = -T_1 \cdot \cos\{(2\pi i/n) + \phi_1\} + T_1 \cdot \cos\{(2\pi i/n) + \phi_2\} \quad (6A)$$

Based upon the above defined equations, the errors caused by the misalignment between the central axis of the holder and the optical axis of the image-forming optical subsystem are isolated by obtaining $(X_i' + X_i'')$ over i being from 0 to n−1. From the above equations (5) and (5A), $(X_i' + X_i'')$ is equal to $\{(5) + (5A)\}/2$. Similarly, from the above equations (6) and (6A), $(Y_i' + Y_i'')$ is equal to $\{(6) + (6A)\}/2$.

$$(X_i' + X_i'')/2 = T_2 \cdot \cos\{(2\pi i/n) + \phi_2\}$$

$$(Y_i' + Y_i'')/2 = T_2 \cdot \sin\{(2\pi i/n) + \phi_1\}$$

Figure 9A:
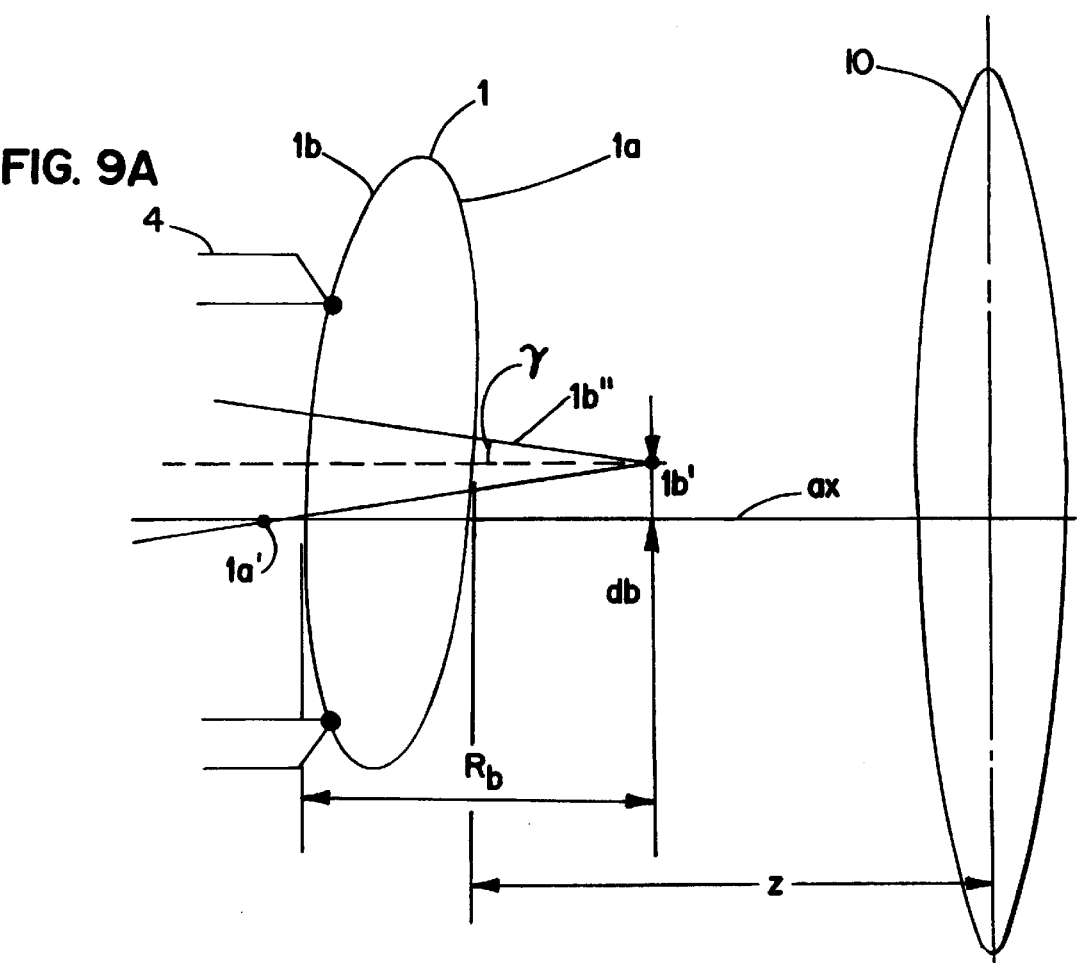
FIG. 9A is an enlarged cross sectional view of certain lens components at a third optical position according to the current invention.

Now referring to FIG. 9A, after the eccentricity of the first aspherical lens surface 1a has been determined, one preferred method according to the current invention performs the following steps to determine the eccentricity of a second lens surface 1b. Assuming that the second lens surface 1b is aspherical and has some eccentricity, referring to FIGS. 9A and 9B, the optical distance controller now places the image-forming optical subsystem at a third optical position where the distance Z between the first aspherical lens surface 1a and the objective lens 10 is expressed by the following relation:

$$Z = -R_a(R_b - t)/[n \cdot R_a + (1-n) \cdot (R_b - t)]$$

where $R_a$ is a radius of the substantially spherical portion of the first aspherical lens surface 1a while $R_b$ being a radius of the substantially spherical portion of the second aspherical lens surface 1b. n is a refraction index of the aspherical lens. t is a thickness of between the first aspherical lens surface and the second aspherical lens surface. The aspherical lens 1 is placed in the above described third optical position from the previous first or second optical position without repositioning the aspherical lens 1 in the lens holder 4.

Now referring FIG. 9A, at the above described third optical position, the second aspherical lens surface 1b sits on the lens holder 4 and has a center 1b' of curvature or a substantially spherical portion near its paraxis 1b". As described above, Rb is a radius of the substantially spherical portion of the second aspherical lens surface 1b. Since the second aspherical lens surface 1b has some eccentricity γ, the center 1b' of the curvature is not located on the optical axis ax. On the other hand, had the second aspherical surface 1b has no eccentricity, the center 1b' of the curvature in the paraxial region would fall on the optical axis ax. The light ray going through the center 1a' of curvature of the first aspherical lens near the paraxis also passes the center 1b'. The light rays reflected back from the second aspherical surface 1b thus forms an image at 1b' at the third optical position.

Figure 9B:
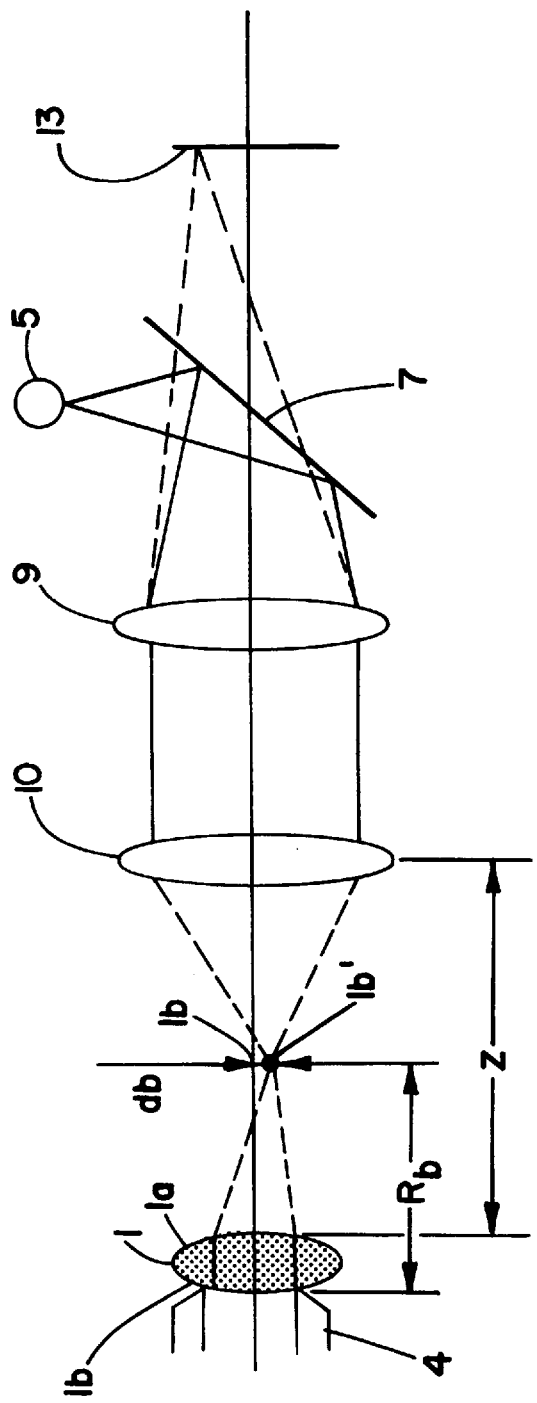
FIG. 9B is a diagram illustrating positional relations among optical components including an aspherical lens surface with eccentricity in an image-forming optical subsystem at the third optical position.

Now referring to FIG. 9B, an expanded view of the image-forming optical subsystem illustrates an image formation on an image plane 13 at the above described third optical position. The light rays reflected from the second aspherical lens surface 1b travels through the first objective lens located at the above specified distance Z from the first aspherical lens surface 1a, the second objective lens and the beam splitter 7. The center coordinates of the image formed on the image plane 13 is analyzed by the image-analysis subsystem.

Figure 9C:
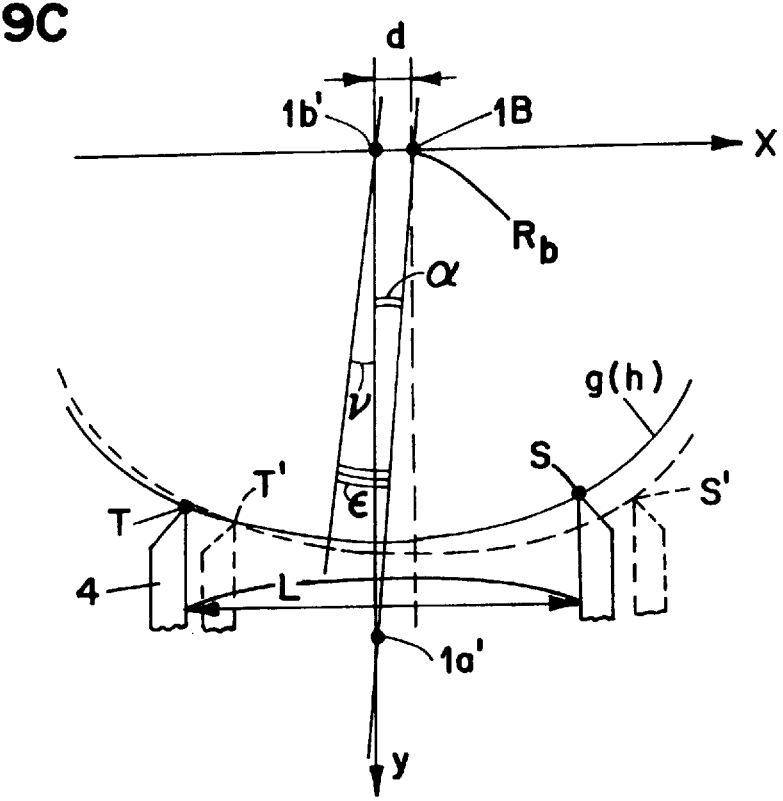
FIG. 9C is a cross sectional view illustrating conceptually rotated positional relations among optical components including an aspherical lens surface with eccentricity in an image-forming optical subsystem at the third optical position.

Referring to FIG. 9C, the eccentricity of the aspherical surface 1b is considered in terms of a function g(h) expressing the second aspherical lens surface. For the sake of convenience in visualizing the above function, the central axis of the holder 4 is placed on the Y axis by conceptually rotating the lens and holder by 90 degrees. Assuming that the second aspherical lens surface 1b does not have measurable eccentricity, the second aspherical lens surface is placed on the lens holder 4 at contact points T and S as indicated by solid lines. The center 1b' of the curvature of the second aspherical lies on the central axis of the holder 4 on the Y axis. The distance between S and T is a diameter or size L of the opening of the holder 4. The coordinates of the contact points S and T are respectively (h, $R_b - g(h)$) and (h−L, $R_b - g(R_b - g(h-L))$). If h=L/2 or the central axis of the holder 4 is substantially in the center of the opening, $R_b - g(h) = R_b - g(R_b - g(h-L))$. In other words, at h=L/2, g(h) is equal to $g(R_b - g(h-L))$. This relation will be later used in solving an equation.

Still referring to FIG. 9C, now assuming that the second aspherical lens surface 1b has eccentricity in the amount of γ, the second aspherical lens surface is conceptually moved to lie on the virtual contact points S' and T' as shown in dotted lines. Although the first aspherical lens surface 1a has eccentricity as indicated by α, since the image is formed through the first aspherical lens surface and the center 1a' of the substantially spherical portion of the first aspherical lens surface lies on the optical axis, the eccentricity α can be ignored in the consideration of the second aspherical surface eccentricity. The reflected light rays forms an image between the center 1B of the curvature of the second aspherical lens surface with eccentricity γ and the optical axis Y. In order to determine the size d of the image, the value of h which corresponds to the coordinates of S' and T' is solved by converging the following equation and by using the above described relation $g(h) = g(R_b - g(h-L))$:

$$h \sin \gamma + (R_b - g(h))\cos \gamma = (H-L) \sin \gamma + (R_b - g(h-L))\cos \gamma$$

Let the solved h value be h', the distance d is equal to $-h' \cos \gamma + (R_b - g(h))\cos \gamma - L/2$.

Still referring to FIG. 9C, to take the eccentricity of the first aspherical lens surface 1a into account in determining the eccentricity of the second aspheric lens 1b based upon the above obtained distance d, a coefficient ξ is determined as follows.

$$\xi = d/\epsilon$$

where $\epsilon = \alpha + \gamma$. $\alpha$ indicates an angle between the optical axis of the aspherical lens 1 and the optical axis of the image-forming optical subsystem when the center $1a'$ of the curvature near the paraxial region lies on the optical axis of the image-forming optical subsystem. Since $\gamma$ is an angle indicating the eccentricity of the second aspherical lens surface $1b$, $\xi = \alpha + \gamma$ indicates the eccentricity of the first aspherical lens surface $1a$. In other words, $\xi$ provides a conversion factor for converting the measured eccentricity in the second aspherical surface $1b$ into the image size d. In summary, $\xi$ is a conversion factor or coefficient used in determining eccentricity of the second aspherical surface and can be predetermined based upon the holder opening size L and the second aspherical lens surface information.

Based upon the above described information on the second aspherical lens surface, one preferred method according to the current invention performs the following steps for determining the eccentricity of both the first aspherical lens surface and the second aspherical lens surface. After the optical axis of the aspherical lens mounted on the holder is adjusted at the initial optical position, the aspherical lens is placed at the above described second optical position. At second optical position, first center coordinates $X_a$ and $Y_a$ of an image formed through a first location on the first aspherical lens surface are stored. The aspherical lens is then moved to the above described third optical position without repositioning the aspherical lens on the holder. At the third optical position, second center coordinates $X_b$ and $Y_b$ of an image formed through a second location on the second aspherical lens surface are stored.

One preferred method according to the current invention firstly determines the eccentricity $\epsilon_b$ of the second aspherical lens surface and then that of the first spherical lens surface. The eccentricity $\epsilon_b$ is obtained based upon the following equation:

$$\epsilon_b = \mu \cdot \sqrt{(X_b^2 + Y_b^2)/(2\beta \cdot m \cdot \xi)}$$

where $\mu$ is the number of pixels in 1 mm of detection unit in a CCD camera. $\beta$ is a ratio of the focal length $f_2/f_1$ of the objective lens in the image-forming optical subsystem. m is a transmissivity magnification factor of the first aspherical lens surface $1a$ and defined as $n/[n \cdot R_a + (1-n) \cdot (R_b - t)]$. $\xi$ is a predetermined coefficient for determining a shift amount of the second aspherical lens surface. A tilt amount of the eccentricity of the second aspherical lens surface designated by $\theta_b$ is obtained based upon the following relation:

$$\theta_b = \tan^{-1}(X_b/Y_b) \cdot 180/\pi.$$

In order to determine the eccentricity of the first aspherical lens surface, one preferred method according to the current invention prepares first intermediate values $\alpha_X$ and $\alpha_Y$ based upon the following relations:

$$\alpha_X = \sin^{-1}[\gamma \cdot X_b/\{2\beta \cdot m(R_b - R_a - t)\}]$$

$$\alpha_Y = \cos^{-1}[\gamma \cdot X_b/\{2\beta \cdot m(R_b - R_a - t)\}]$$

Using the above first intermediate values, the preferred method now prepares second intermediate values $X_{a'}$ and $Y_{a'}$:

$$X_{a'} = \{\gamma/(2\beta)\}X_a \cdot \cos \alpha_X - \Delta R \cdot \sin \alpha_X$$

$$Y_{a'} = \{\gamma/(2\beta)\}X_a \cdot \cos \alpha_Y - \Delta R \cdot \sin \alpha_Y$$

Finally, the preferred method performs the following step of determining a shift amount $\epsilon_a$ of the first eccentricity of the first aspherical lens surface based upon said second intermediate values and the following relation:

$$\epsilon_a = \sin^{-1}\left\{\sqrt{(X_{a'}^2 + Y_{a'}^2)/\Delta R}\right\}$$

The preferred method also determines a tilt amount of the first eccentricity of the first aspherical lens surface designated by $\epsilon_a$ based upon the second intermediate values and the following relation:

$$\theta_a = \tan^{-1}(Y_{a'}/X_{b'}) \cdot 180/\pi$$

The preferred method concludes the process by optionally displaying all or selected values related to the eccentricity of the first and second aspherical lens surfaces. Furthermore, the preferred method optionally determines and displays the pass or failure of a particular aspherical lens surface according to a predetermined threshold value or a tolerance range.

According to the current invention, one alternative method obtains the above described rotation measurements at the second and third optical positions for substantially minimizing errors which cause inaccurate eccentricity values. As described above for the rotational measurement techniques, as the aspherical lens is rotated 360 degrees at the second and third optical positions, at a predetermined set of angles, one preferred rotational method measures a pair of center coordinates of an image formed by the image-forming optical system. Another preferred rotational method additionally takes another pair of the center coordinates of the image after the aspherical lens is rotated 180 degrees from the starting position.

Figure 10:
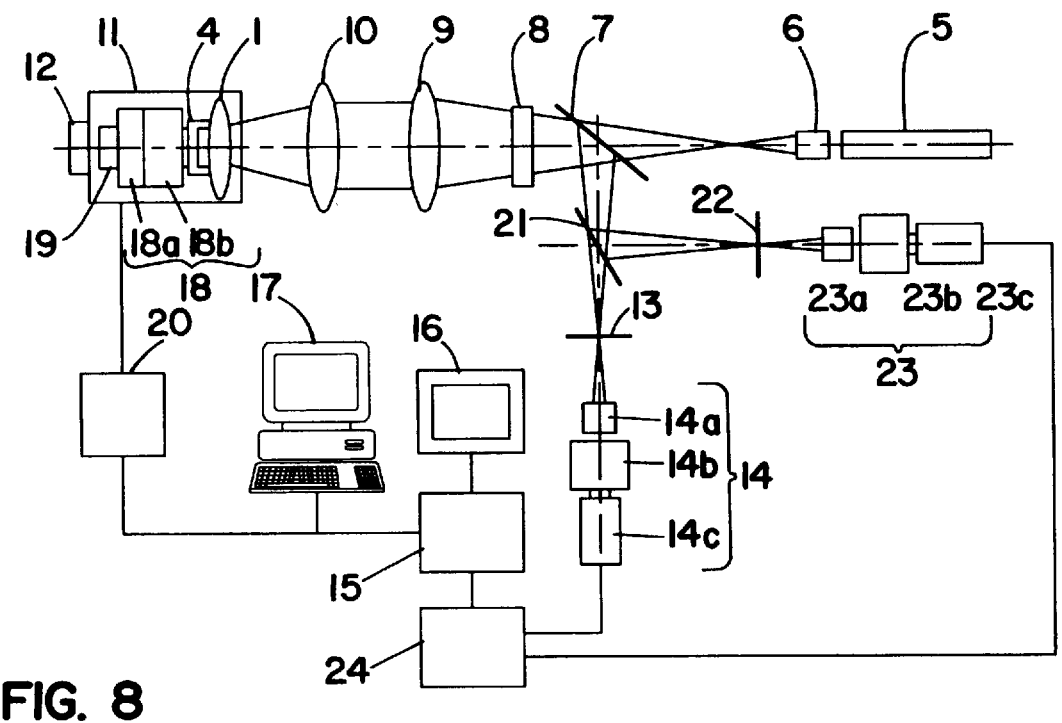
FIG. 10 is a diagram illustrating a third preferred embodiment of a system of measuring eccentricity of an aspherical lens surface by simultaneous forming images at the initial optical position and at the second optical position without repositioning the optical lens according to the current invention.

Now referring to FIG. 10, a first alternative embodiment according to the current invention allows to form the image at the first and second optical positions at the same time without repositioning any component. The alternative embodiment of the eccentricity measurement system is substantially similar to one preferred embodiment as described with respect to FIG. 7. However, the alternative embodiment as shown in FIG. 10 additionally includes a second beam splitter 21, a second reticule 22, a second set of image-forming device 23 and a video selector 24.

The optical distance controller includes the above described components to provide the images at different positions without physically changing the positions of the lens components. The additional components simultaneously form the second image at the second optical position while the original image-forming device 14 forms a first image at the initial optical position. The second beam splitter 21 is located between a first beam splitter 7 and a first reticule 13 and redirects the light rays towards the second image forming device 23. The second image-forming device 23 further includes a second microscope objective lens $23a$, a second camera lens $23b$ and a second CCD camera $23c$. The second reticule 22 is located at a predetermined position along a redirected optical axis to form the image using light rays passing through a specific location of the aspherical portion of the first aspherical lens surface. The distance $\Delta P$ from the second reticule 22 to the objective lens 9 is defined as $(f_2/f_1)^2 \Delta R$. $\Delta P$ is positive when the center of the curvature of the specific aspherical location is farther away from the aspherical lens surface than the center of the substantially spherical portion. $\Delta P$ is negative when the center of the curvature of the specific aspherical location is closer to the aspherical lens surface than the center of the substantially spherical portion. The two simultaneously formed images are analyzed by the image-analysis subsystem 15 one at a time, and the video selector 15 selects one of these images in response to the CPU unit 17 and the image-analysis unit 15.

Figure 11:
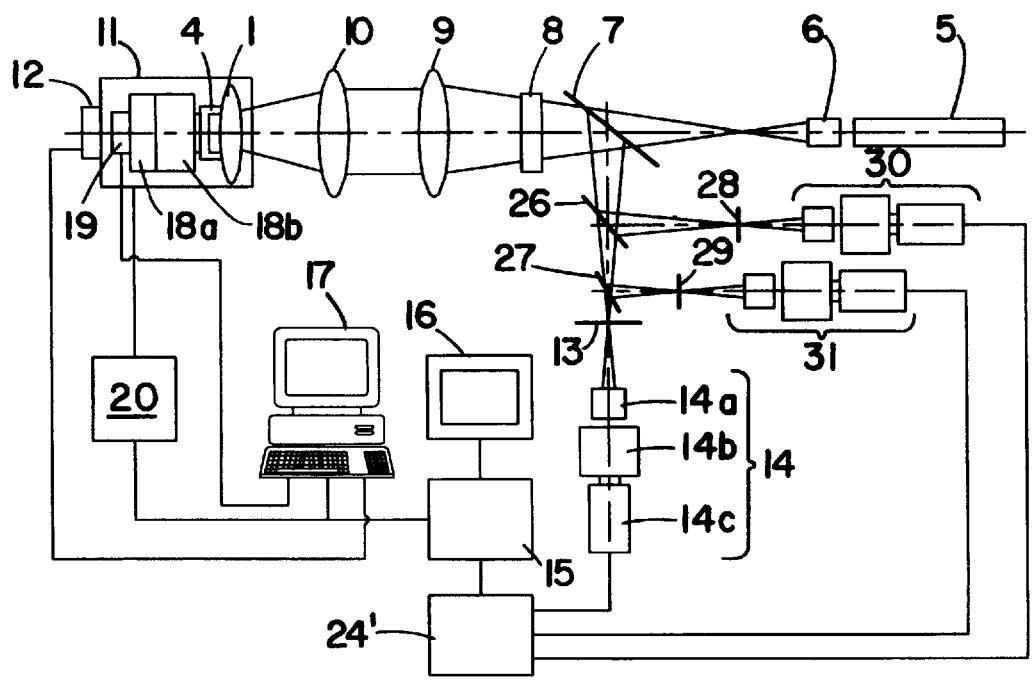
FIG. 11 is a diagram illustrating a third preferred embodiment of a system of measuring eccentricity of an aspherical lens surface by simultaneous forming images at the initial optical position, at the second optical position and at the third optical position without repositioning the optical lens according to the current invention.

Now referring to FIG. 11, a second alternative embodiment according to the current invention further includes two sets of the image-forming components 30 and 31 in addition to the original set 14. In general, the second alternative embodiment is substantially similar to the system described with respect to FIGS. 7 and 10. The second and the third sets 30 and 31 respectively form a second and third image at the second and third optical positions. The corresponding reticules 28 and 29 are respectively located at the predetermined positions where the reflected and redirected light rays forming the second and third image are converged. Thus, the second alternative embodiment allows to form the first, second and third images at the same time without repositioning the lens components, and the optical distance controller includes the above described components for optically modifying the distance for forming the various images.

Figure 12:
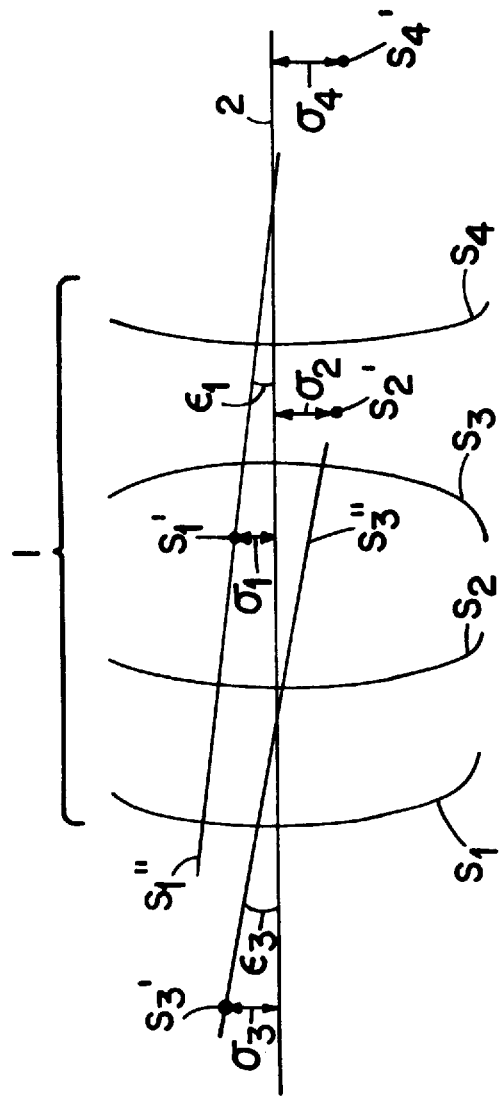
FIG. 12 is a diagram illustrating a lens assembly containing multiple aspherical lens surfaces to be measured.

Referring to FIG. 12, in contrast to a single aspherical lens, a lens assembly 1 containing multiple aspherical surfaces is illustrated. The above described preferred eccentricity measurement methods and systems are applicable to such a lens assembly containing a plurality of aspherical lens surfaces. In this example, the optical axis 2 is of the lens assembly 1 is substantially aligned with a central axis of a lens assembly holder, and light rays travel from the left to the right of the lens assembly 1. The lens surfaces $S_1$ and $S_3$ are aspherical while the lens surfaces $S_2$ and $S_4$ are spherical. The spherical lens surfaces $S_2$ and $S_4$ respectively have centers of curvature $S_2'$ and $S_4'$. However, the centers of curvature $S_2'$ and $S_4'$ are located both off the optical axis 2 respectively by $\sigma^2$ and $\sigma^4$. $\sigma^2$ and $\sigma^4$ respectively define the eccentricity of the spherical lens surfaces $S_2$ and $S_4$, and the spherical lens eccentricity is uniform across the lens surface.

Still referring to FIG. 12, the aspherical lens surfaces $S_1$ and $S_3$ are generated by rotating a complex curve around the Y axis. The complex curve is defined by a high-degree function such as $Y=f(h)=(h^2/R)/[1+\sqrt{1-(K+1)(h^2/R^2)}]+Ah^2+Bh^4+Ch^6+\ldots$ where R is a radius of the substantially spherical region near the paraxis and K, A, B, C are constants. Lines $S_1''$ and $S_3''$ respectively indicate a paraxis for the aspherical lens surfaces $S_1$ and $S_3$, and points $S_1''$ and $S_3''$ are respectively a center of curvature or the substantially spherical portion near the paraxis $S_1''$ and $S_3''$. The eccentricity of the aspherical lens surface $S_1$ is defined by a shift $\sigma^1$ which is a distance between the center of curvature $S_1'$ and the optical axis 2 and is alternatively defined by a tilt $\epsilon_1$ which is an angle formed between the paraxis $S_1''$ and the optical axis 2. Similarly, the eccentricity of the aspherical lens surface $S_3$ is defined by a shift $\sigma^3$ which is a distance between the center of curvature $S_3'$ and the optical axis 2 and is alternatively defined by a tilt $\epsilon_3$ which is an angle formed between the paraxis $S_3''$ and the optical axis 2.

Figure 13A:
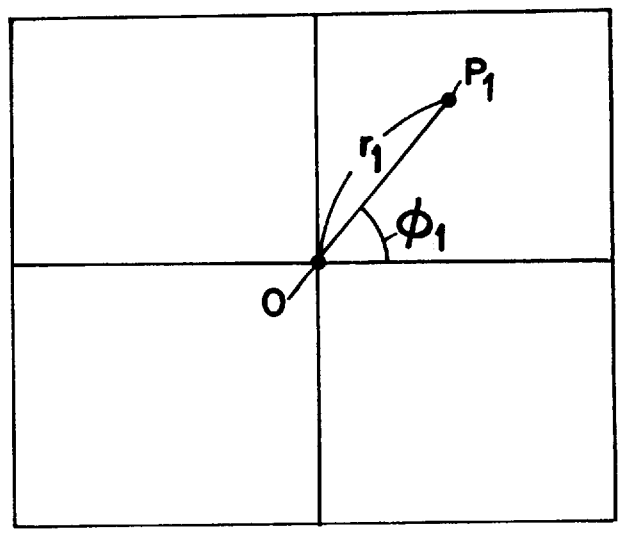
FIG. 13A is a diagram illustrating an image at the initial optical position as viewed on a display monitor according to the current invention.

In order to measure the above defined eccentricity values in a lens assembly, a preferred measurement method according to the current invention performs the following steps. After the lens assembly is mounted on a lens assembly holder, a first image is formed at the initial optical position. Referring now to FIG. 13A, assuming that the aspherical lens surface $S_1$ has eccentricity, an image as viewed at a monitor display of an image-forming optical subsystem is illustrated. A point $P_1$ is the center of a spot image formed at the initial optical position, and a point O is the optical axis of the image-forming optical subsystem. The location of the point $P_1$ is defined by a distance $r_1$ and an angle $\phi_1$. The measure angle $\phi_1$ directly corresponds to the direction of eccentricity of the aspherical lens surface $S_1$. On the other hand, the distance $r_1$ is not the shift amount $\sigma^1$. To convert the distance $r_1$ into the shift amount $\sigma^1$, assuming that the image-forming unit or a camera unit has a magnification m, there exists a relation $r_1=m2\sigma^1$. Thus, the shift amount $\sigma^1$ is determined by obtaining $r_1/2m$.

Figure 13B:
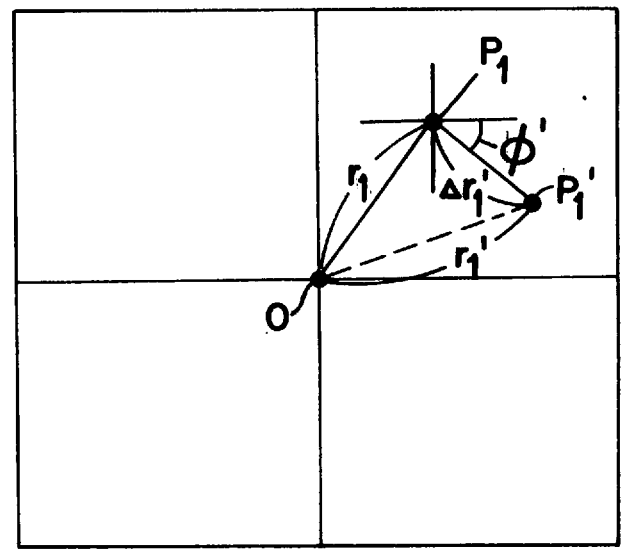
FIG. 13B is a diagram illustrating an image at the second optical position superimposed on the image at the initial optical position as viewed on a display monitor according to the current invention.

Still referring to FIG. 13B, the above described spot image $P_1$ has moved to $P_1'$ in response to the optical positional change $\Delta R_1$ from the initial optical position to the second optical position. The distance $r_1$ is determined by $r_1$, $\Delta r_1'$, and $\phi_1'$, and the value of al is defined by $r_1'/2m$. In order to finally determine, the tilt eccentricity amount $\epsilon_1$ of the first aspherical lens surface, a step of obtaining $\sin^{-1}(U_1/\Delta R_1)$ where $U_1=(r_1/2m)-(r_1'/2m)$.

After the eccentricity of the aspherical surface $S_1$ has been determined, referring back to FIG. 12, the preferred method performs the steps of measuring the eccentricity of the spherical lens surface $S_2$. The optical distance controller positions the image-forming optical subsystem so that light rays are converged at the center $S_2'$ of the curvature of the second spherical lens $S_2$ without repositioning the lens assembly in the lens assembly holder. A distance $r_2$ is measured on an image display monitor in the above described manner. Since the $S_2$ surface is spherical, $r_2$ does not depend on a specific location on the lens surface. For this reason, the distance $r_2$ is directly converted into a shift eccentricity amount $\sigma^2$ by dividing $r_2$ by a magnification factor $m_2$. The magnification factor $m_2$ is a combined magnification of all of the lens components located between the spherical lens surface $S_2$ and a CCD camera for digitizing the image. In this particular example as shown in FIG. 12, although the aspherical lens surface $S_1$ is not located between the above specified positions, the magnification factor $m_2$ includes the magnification of $S_1$ since the light rays reflected from $S_2$ is already refracted by $S_1$. The direction of the eccentricity is directly measured by the corresponding angle $\phi_2$.

The preferred eccentricity measurement method essentially repeats either of the above described steps for determining the eccentricity of the unexamined lens surfaces in the lens assembly 1. For an aspherical lens surface $S_3$, the steps performed to determine the $S_1$ eccentricity are repeated. Despite the fact that the aspherical lens $S_3$ is a concave lens with respect to the direction of the light rays, substantially the same steps are performed to determine its eccentricity. For a spherical lens surface $S_4$, the steps performed to determine the $S_2$ eccentricity are repeated. Thus, the above described preferred method sequentially determines the eccentricity of each lens surface in a lens assembly. In an alternative method, in stead of determining an eccentricity value for each lens surface based upon the corresponding measurements, the eccentricity values of all the surfaces are determined after completing the measurements. In another alternative method, an ideal optical axis of the image-forming optical subsystem is calculated by minimizing the eccentricity values. The eccentricity value is further reevaluated based upon the ideal optical axis.

Figure 14:
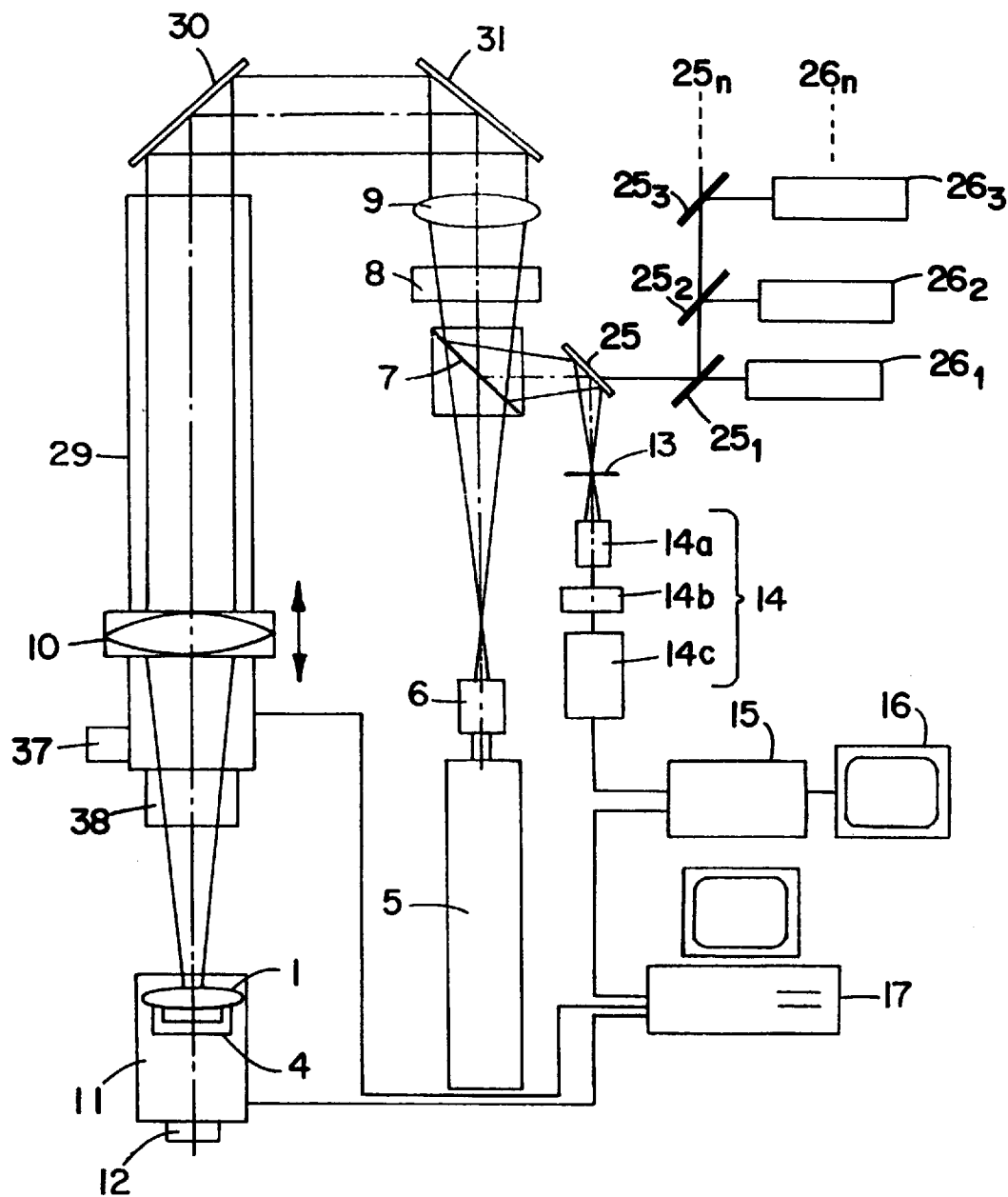
FIG. 14 is a diagram illustrating a fourth preferred embodiment of a system of measuring eccentricity of lens surfaces in a lens assembly by simultaneous forming images at each of the lens surfaces without repositioning the optical lens according to the current invention.

Now referring to FIG. 14, in order to more efficiently measure the eccentricity of multiple lens surfaces in a lens assembly, an alternative embodiment according to the current invention includes multiple sets of image-forming devices $25_i$ and $26_i$ where i ranges from 1 to n. Each of the image-forming devices $26_i$ includes the identical components as the image forming device 14. This alternative embodiment allows the simultaneous image formation for all of its lens components without physically repositioning any of the lens components. The position of each image-forming device 26 should corresponds to the requirement of each optical components in the lens assembly. In order to later analyze the formed images, the formed images may be stored in the CPU unit 17.

Figure 15:
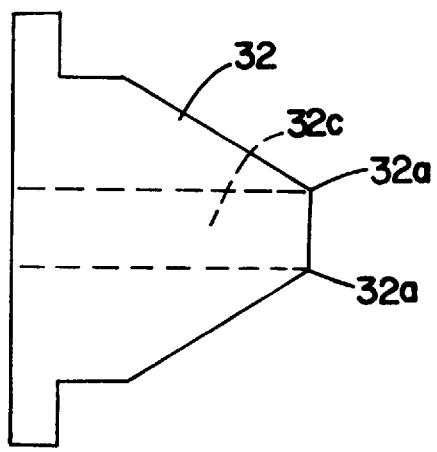
FIG. 15 is a cross-sectional view illustrating a preferred embodiment of a lens holder according to the current invention.

Now referring to FIG. 15, a top view of one preferred embodiment of a lens holder 32 is illustrated. The holder 32 has a hollow cylindrical center 32C, and the outside contour is shaped as a partial cone. The lens is held by vacuum suction at edges 32a of the center hollow tube 32C. Although the lens holder 32 is generally made of plastic, the edges 32a have certain flexible material to prevent the edges 32a from scratching the lens surface.

Figure 16A:
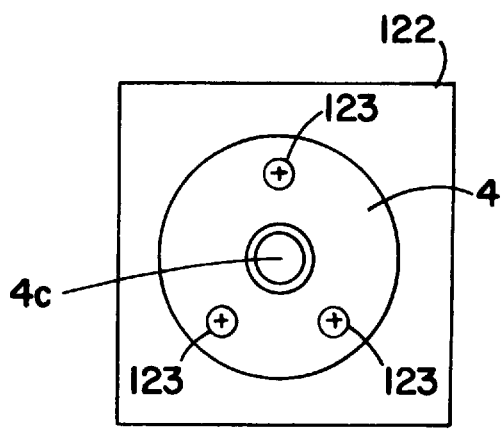
FIGS. 16A and 16B respectively illustrate a front view and a side view of a second preferred embodiment of a lens holder according to the current invention.
Figure 16B:
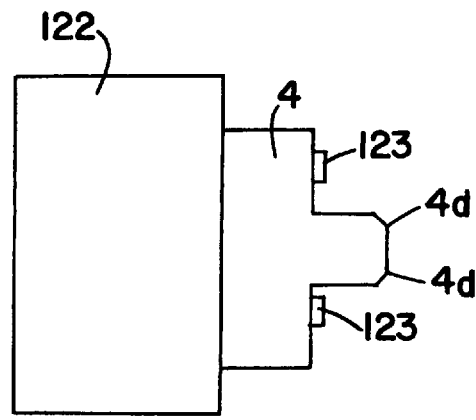

Referring to FIGS. 16A and 16B, another preferred embodiment of the lens holder 4 and a base plate 122 are illustrated in a front view and a side view. The lens holder 4 is screwed on the base plate 122 by three screws 123. A central cylindrical space 4C is located in the center of the lens holder 4, and a lens to be examined is held at the edges 4d of the cylinder by vacuum suction. Depending upon the size and shape of the lens to be examined, the lens holder 4 is changed to one having an appropriate cylinder size by replacing on the base plate 122.

Figure 17:
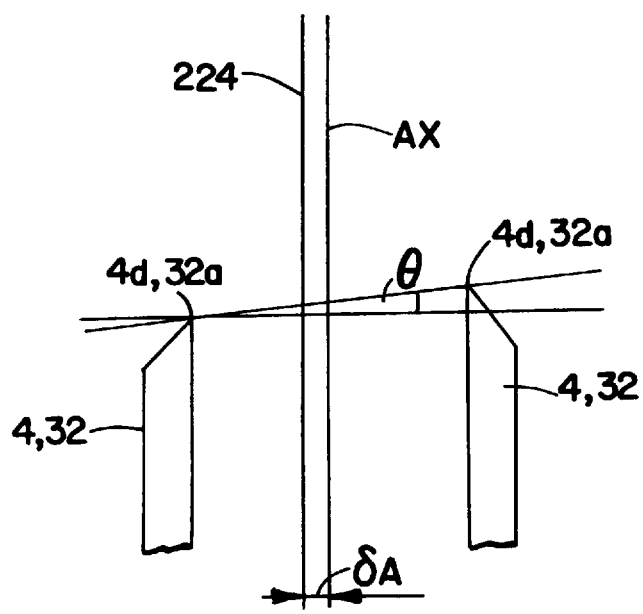
FIG. 17 is a cross-sectional view of a lens contacting edge portion of a lens holder contributing to misalignment.

Referring to FIG. 17, either of the above described embodiments of the lens holder according to the current invention possibly contributes to the misalignment of its central axis with the optical axis AX of an image-forming optical subsystem. For example, the central axis 224 of the holder is off from the optical axis AX by δA. At the same time, a pair of the edges of the holder is misaligned by an angle θ, and the edges 32a or 4d hold the lens to be examined. In order to compensate for the above sources of misalignment between the central axis of the holder and the optical axis of the image-forming optical subsystem, the above described δA and θ are used to determine correction values Gh and Gr which affect the eccentricity determination. The correction values Gh and Gr are determined as follows:

$$Gh = [\sqrt{\{R_a^2 - (L/2)^2\}} \cdot \sin\theta + \delta A] \cdot \Delta R/(R a_b - R_a - t)$$

$$Gr = (R_a - R_b - t) \cdot \sin\alpha + \delta$$

where $R_a$ and $R_b$ are respectively a radius of a substantially spherical region of a lens surface 1a and 1b while t is the thickness of the lens 1. α is an angle between the optical axis of the lens and the optical axis of the image-forming optical subsystem. The above correctional values Gh and Gr are subtracted from the center coordinates the image during an image analysis step.

Figure 18A:
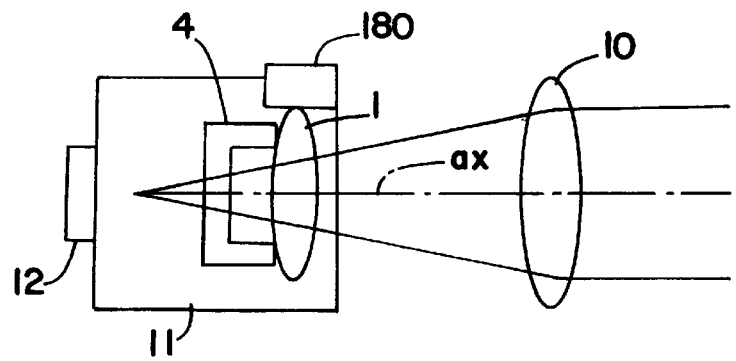
FIGS. 18A and 18B respectively illustrate a top view and a front view of a third preferred embodiment of a lens holder according to the current invention.
Figure 18B:
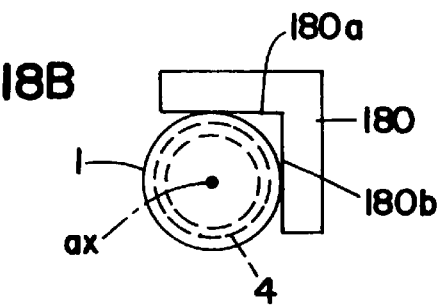

Now referring to FIG. 18A and 18B, a third preferred embodiment of the lens holder 4 and associated structures are respectively illustrated in a top view and a front view. A lens holder 4 includes a lens holder guide section 180 for guiding the lens 1 to be positioned with respect to the optical axis ax. The lens holder 4 and the guide 180 are fixedly located on a stage 11, and the stage 11 is movable. The linear position reader 12 monitors the position of the stage 11. The lens guide 180 is substantially L-shaped for providing two walls for positioning the lens 1 of a known size. The two perpendicularly positioned walls substantially align the optical axis of the lens 1 with the optical axis ax of the image-forming optical subsystem which includes an objective lens 10.

Figure 19A:
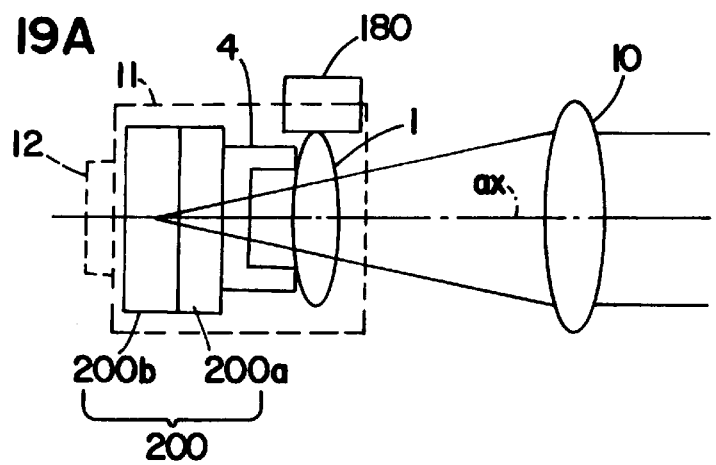
FIGS. 19A and 19B respectively illustrate a top view and a front view of a fourth preferred embodiment of a lens holder connected to a rotational unit according to the current invention.
Figure 19B:
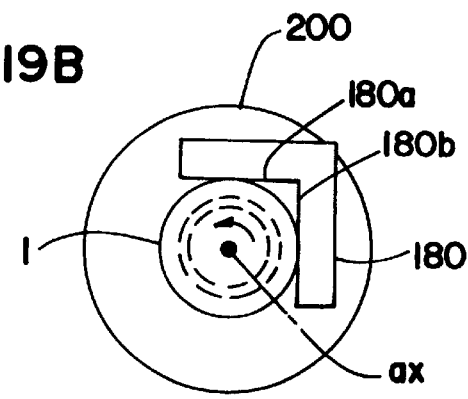

Now referring to FIGS. 19A and 19B, a fourth preferred embodiment of the lens holder 4 and associated structures are respectively illustrated in a top view and a front view. The fourth preferred embodiment is substantially the same as the third preferred embodiment as described with respect to FIGS. 18A and 18B, but it additionally includes a rotational unit 200. The rotational unit 200 rotates about the optical axis ax the lens 1 which is mounted on the holder 4 and is guided by the guide 180. The rotational unit 200 further includes a stepping motor 200b and an air spindle 200a.

Figure 20A:
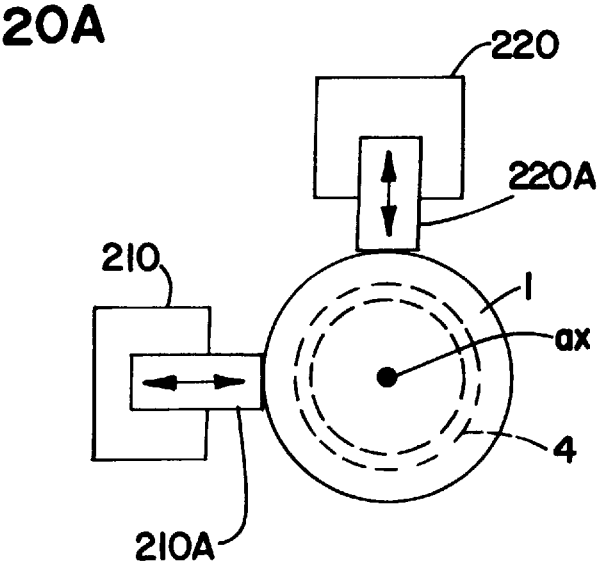
FIG. 20A illustrates a front view of a fifth preferred embodiment of a lens holder according to the current invention.
Figure 20B:
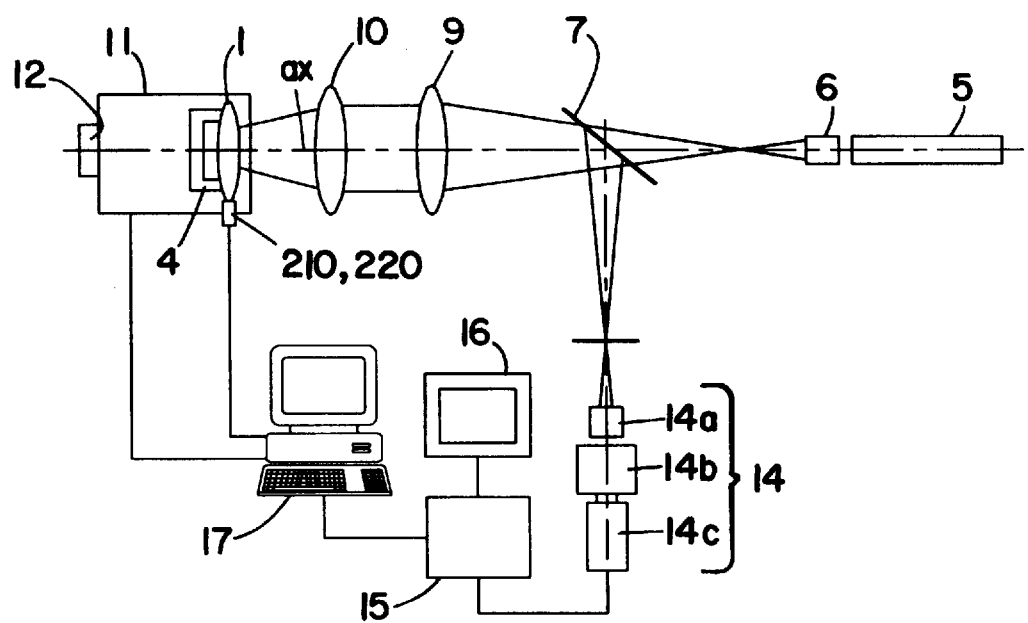
FIG. 20B is a block diagram illustrating a fifth preferred embodiment of a system of measuring eccentricity of an aspherical lens surface with a lens holder adjustment unit of FIG. 20A connected to a control unit according to the current invention.

FIGS. 20A and 20B respectively illustrate a front view of a fifth preferred embodiment of the lens holder 4 and a block diagram of the system for measuring the eccentricity of the lens 1 including the fifth preferred embodiment. The fifth preferred embodiment includes adjustable lens guide units 210 and 220 that respectively include slidable portions 210A and 220A. The slidable portions 210A and 220A are located perpendicularly with each other, and the moving direction of each portion crosses the optical axis ax. One end of the slidable portions 210A and 220A directly contacts an edge of the lens mounted on the lens holder 4. By adjusting the position of either or both of the slidable portions 210A and 220A, the optical axis of the lens 1 is positioned to align with that of the optical system after the lens 1 has been mounted on the holder 4. In order to coordinate the above described adjustments, now referring to FIG. 20B, the adjustment units 210 and 220 are connected to a CPU unit 17 which controls the movements of the slidable portions 210A and 220A. The CPU unit 17 determines the correctional movements of the slidable portions 210A and 220A for aligning the optical axes of the lens 1 and the image forming optical subsystem such as an object lens 9. The above correctional movements are determined in part based upon the information generated by the image-analysis unit 15.

Figure 21A:
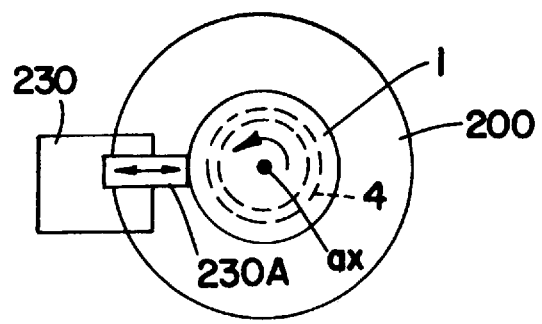
FIG. 21A illustrates a front view of a sixth preferred embodiment of a lens holder according to the current invention.
Figure 21B:
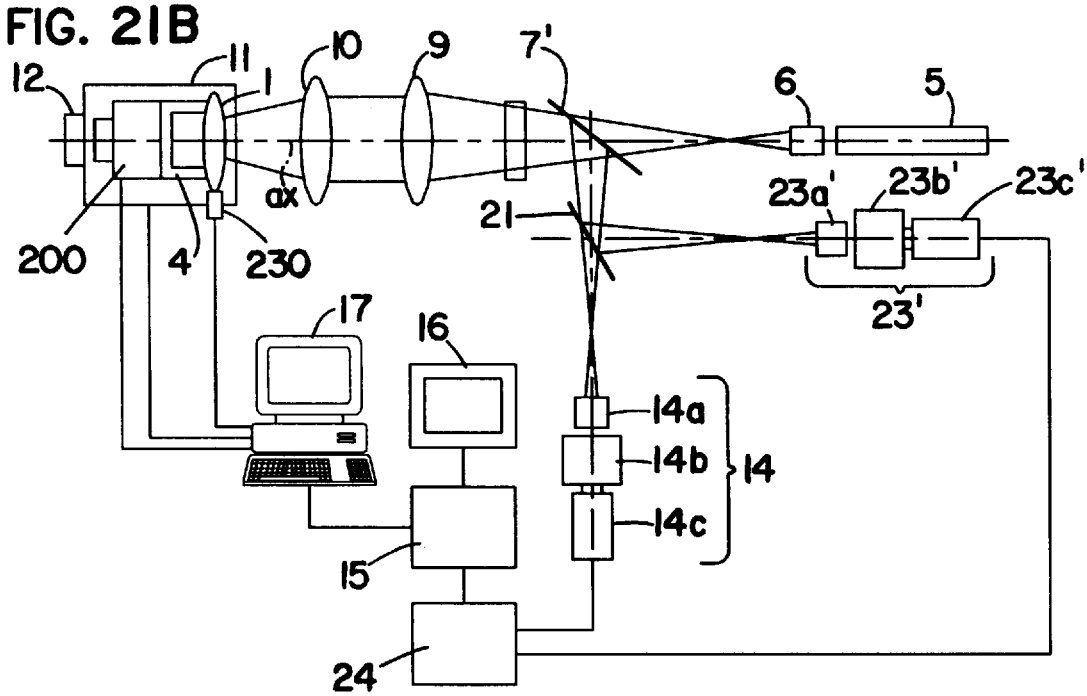
FIG. 21B is a block diagram illustrating a sixth preferred embodiment of a system of measuring eccentricity of an aspherical lens surface with a lens holder adjustment unit of FIG. 21A connected to a control unit according to the current invention.

FIGS. 21A and 21B respectively illustrate a front view of a sixth preferred embodiment of the lens holder 4 and a block diagram of the system for measuring the eccentricity of the lens 1 including the sixth preferred embodiment. The sixth preferred embodiment of the holder according to the current invention is a simplified version of the fifth preferred embodiment as described with respect to FIG. 20A. The six preferred embodiment has one adjustable lens guide unit 230 and its corresponding slidable portion 230A, which travels in a horizontal plane including the optical axis ax. One end of the slidable portion 230A directly contacts the lens 1 mounted on the holder to move the lens optical axis for alignment. Referring to FIG. 21B, the sixth preferred embodiment of the holder 4 further combines a rotational unit 200 for rotating the lens 1 and the holder 4 in response to a CPU unit 17. The CPU unit 17 also controls the movement of the slidable portion 230A. Furthermore, one preferred embodiment of the aspherical lens eccentricity measurement system according to the current invention additionally combines a second image-forming unit 23' for forming a second image.

Figure 22A:
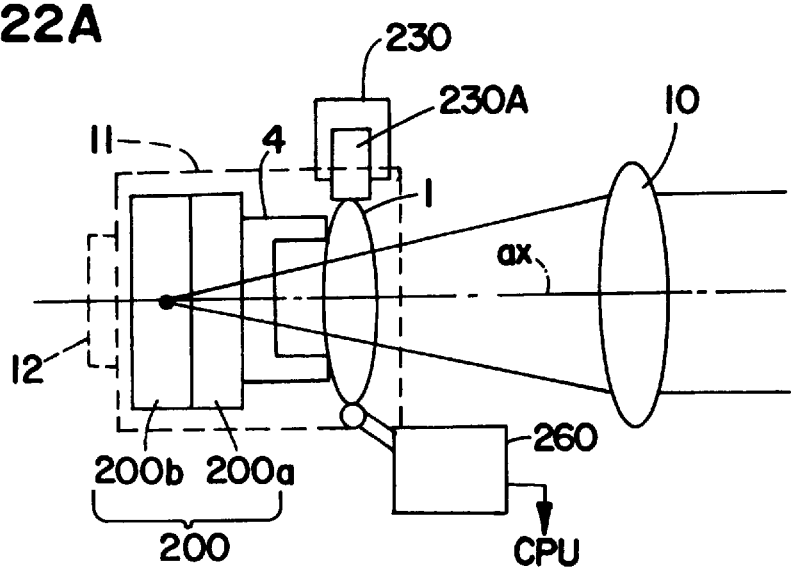
FIG. 22A illustrates a cross sectional view of a seventh preferred embodiment of a lens holder according to the current invention.
Figure 22B:
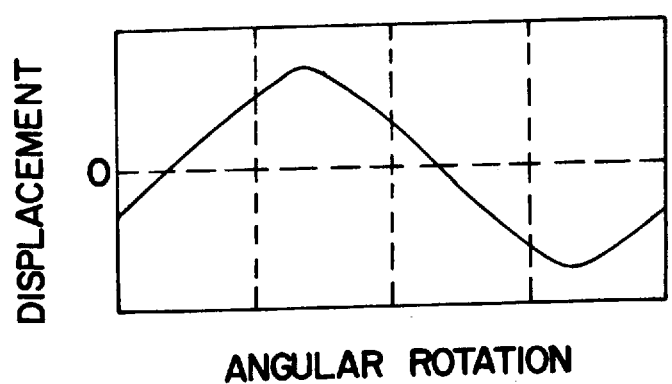
FIG. 22B is a graph illustrating an amount of displacement detected by a sensor placed at the edge of the rotating lens to be examined.

Referring to FIG. 22A, a top view of a seventh preferred embodiment of the lens holder 4 and associated structures is illustrated according to the current invention. In addition to the sixth preferred embodiment as described with respect to FIG. 21A, the seventh preferred embodiment additionally includes a displacement sensor 260 located at the edge of a lens 1. The displacement sensor 260 detects displacement caused by the edge of the rotating lens 1 and transmits the corresponding signal to a CPU unit. The CPU unit in response to the signal from the displacement sensor 260 generates a correctional signal and send it to an adjustable lens guide unit 230 for moving its slidable portion 230A. FIG. 22B illustrates one example of the signal generated by the displacement sensor 260. The CPU unit and the adjustable lens guide unit 230 attempt to substantially reduce the displacement amount in FIG. 22B to zero so that the optical axis of the lens 1 coincides the central axis of the rotation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of measuring eccentricity of an aspherical lens using an image-forming optical subsystem, the aspherical lens having a substantially spherical portion near a paraxial region and an aspherical portion, comprising the steps of:
   a) placing the aspherical lens in a holder so that a first optical axis near the paraxial region of the aspherical lens is substantially in alignment with a predetermined central axis of the holder, said step a) further comprising:
      1) measuring an amount of misalignment using said first image for correcting the alignment;
      2) moving the aspherical lens according to said measured amount; and
      3) repeating said steps 1) and 2) until a predetermined level of said alignment is reached;
   b) forming a first image through the substantially spherical portion using the image-forming optical subsystem whose second optical axis substantially coincides with said first optical axis;
   c) storing a first set of coordinates of a center of said first image formed in said step b);
   d) forming a second image through a predetermined position in the aspherical portion using the image-forming optical subsystem,
   e) storing a second set of coordinates of a center of said second image formed in said step d); and
   f) determining an amount of eccentricity of the aspherical lens based upon said first set and said second set of said coordinates stored in said steps c) and e).

2. The method of measuring eccentricity of an aspherical lens according to claim 1 wherein the aspherical lens converges light rays.

3. The method of measuring eccentricity of an aspherical lens according to claim 1 wherein the aspherical lens diverges light rays.

4. The method of measuring eccentricity of an aspherical lens according to claim 1 wherein the aspherical lens has a first lens surface and a second lens surface, at least one of said first lens surface and said second lens surface being aspherical.

5. The method of measuring eccentricity of an aspherical lens according to claim 1 wherein said alignment is manually performed by minimizing a size of said first image formed in said step b).

6. The method of measuring eccentricity of an aspherical lens according to claim 1 wherein said alignment is manually performed by placing the aspherical lens at a predetermined location in the holder.

7. The method of measuring eccentricity of an aspherical lens according to claim 1 wherein said step b) is performed by placing a focal point of the image-forming optical subsystem at a para-axial curvature center of the substantially spherical portion of the aspherical lens, the image-forming optical subsystem projecting substantially parallel light rays towards the aspherical lens.

8. The method of measuring eccentricity of an aspherical lens according to claim 7 wherein said step d) further comprises steps of:
   j) determining a first distance from said para-axial curvature center to an aspherical curvature center for said predetermined position of said aspherical portion; and
   k) placing said focal point of the image-forming optical subsystem at said aspherical curvature center.

9. The method of measuring eccentricity of an aspherical lens according to claim 8 wherein said first distance is designated by $\Delta R$ and is determined by $$\Delta R = \{1/Z'(H)\}H + Z(H) - R_0 \text{ aspherical}$$

where $R_0$ is a radius of the substantially spherical portion, $Z'(H)$ being a derivative of $Z(H)$, $Z$ being a function expressing the aspherical lens surface, H being a constant indicating said predetermined location of said aspherical portion.

10. The method of measuring eccentricity of an aspherical lens according to claim 9 wherein said step k) is accomplished by moving the holder along said first optical axis by said first distance.

11. The method of measuring eccentricity of an aspherical lens according to claim 9 wherein said step k) is accomplished by moving at least a part of the image-forming optical subsystem along said second optical axis by said first distance.

12. The method of measuring eccentricity of an aspherical lens according to claim 9 wherein the image-forming optical subsystem includes a first lens having a first focal length of $f_1$, a second lens having a second focal length of $f_2$ and a CCD camera having a pixel size of $\gamma$.

13. The method of measuring eccentricity of an aspherical lens according to claim 12 wherein said step f) further comprises additional steps of:
   l) determining a second distance D between said first set of coordinates defined as $(X_1, Y_1)$ and said second set of coordinates defined as $(X_2, Y_2)$ based upon a following relation:

$$D = \sqrt{[\{X_2 - (R_0 - R_1 - t + \Delta R) \cdot X_1/(R_0 - R_1 - t)\}^2 + \{Y_2 - (R_0 - R_1 - t + \Delta R) \cdot Y_1/(R_0 - R_1 - t)\}^2]}$$

where $R_0$ is a first radius of the substantially spherical region of the aspherical lens surface whose eccentricity is to be determined, $R_1$ being a second radius of said curvature opposite to the aspherical lens surface, t being a thickness of the aspherical lens; and
   m) determining said eccentricity in a shift amount radian $\theta$ based upon a following relation:

$$\theta = \sin^{-1}\{(f_1 \cdot D \cdot \gamma)/2 \cdot f_2 \cdot \Delta R)\} \cdot 180 \cdot 60/\pi.$$

14. The method of measuring eccentricity of an aspherical lens according to claim 13 wherein said eccentricity is also determined in a tilt amount $\phi$ based upon a following relation:

$$\phi = \tan^{-1}[\{Y_2 - (R_0 - R_1 - t + \Delta R) \cdot Y_1/(R_0 - R_1 - t)\}/\{X_2 - (R_0 - R_1 - t + \Delta R) \cdot X_1/(R_0 - R_1 - t)\}^2].$$

15. The method of measuring eccentricity of an aspherical lens according to claim 12 wherein said step c) further comprises additional steps of:

n) rotating the aspherical lens about said predetermined central axis of the holder to a predetermined set of angles; and o) storing a first additional set of coordinates of an image formed at each of said predetermined angles, said first additional sets of coordinates being designated as $X_{1i}$, $Y_{1i}$ where i ranges from 0 through n−1;

wherein said step e) further comprises additional steps of:

p) rotating the aspherical lens about said predetermined central axis of the holder to said predetermined set of said angles; and q) storing a second additional set of coordinates of an image formed at each of said predetermined angles, said second additional sets of coordinates being designated as $x_{2i}$, $y_{2i}$ where i ranges from 0 through n−1; and wherein said step f) further includes an additional step r) adjusting said eccentricity based upon said first additional sets and said second additional sets of said coordinates so as to substantially minimize an error component contributed by the placement of the aspherical lens during said step k).

16. The method of measuring eccentricity of an aspherical lens according to claim 15 wherein said step r) further comprises additional steps of:

s) determining a third distance T between said first additional sets of coordinates designated by $(X_{1i}, Y_{1i})$ and said second additional sets of coordinates designated by $(X_{2i}, Y_{2i})$ based upon said first distance designated by $\Delta R$ and a following relation:

$$T = \Sigma \sqrt{[\{(X_{2i} - X_{C2}) - (R_0 - R_1 - t + \Delta R) \cdot (X_{1i} - X_{C1})/(R_0 - R_1 - t)\}^2 + \{(Y_{2i} - Y_{C2}) - (R_0 - R_1 - t + \Delta R) \cdot (Y_{1i} - X_{Ci})/(R_0 - R_1 - t)\}^2]}$$

where the above as well as the following averaged values are taken from 0 to n−1, $X_{c1}=(\Sigma X_{1i})/n$, $X_{C2}=(\sigma X_{2i})/n$, $Y_{c1}=(\sigma Y_{1i})/n$, $Y_{C2}=(\sigma Y_{2i})/n$, $R_0$ is a first radius of the substantially spherical portion of the aspherical lens surface whose eccentricity is to be determined, $R_1$ is a second radius of the substantially spherical portion opposite to the aspherical lens surface, and t is a thickness of the aspherical lens; and t) determining said eccentricity in a corrected shift amount radian $\theta'$ based upon a following relation:

$\theta' = \sin^{-1}\{(f_1 \cdot T \cdot \gamma)/2 \cdot f_2 \Delta R)\} \cdot 180 \cdot 60/\pi$.

17. The method of measuring eccentricity of an aspherical lens according to claim 16 wherein said eccentricity is also determined in a corrected tilt amount $\phi'$ based upon a following relation:

$$\phi' = (1/n)\Sigma \tan^{-1}[\{(Y_{2i} - Y_{C2}) - (R_0 - R_1 - t + \Delta R) \cdot (Y_{1i} - Y_{C1})/(R_0 - R_1 - t)\}/\{(X_{2i} - X_{C2}) - (R_0 - R_1 - t + \Delta R) \cdot (X_{1i} - X_{C1})/(R_0 - R_1 - t)\}].$$

18. The method of measuring eccentricity of an aspherical lens according to claim 12 wherein said step c) further comprises additional steps of:

u) marking one location on an edge of the aspherical lens;

v) rotating the aspherical lens to predetermined angles after said marked position is initially positioned at a predetermined starting angle;

w) storing a first additional set of coordinates of an image formed at each of said predetermined angles, said first additional sets of coordinates being-designated as $X'_{1i}$, $Y'_{1i}$ where i ranging from 0 through n−1;

x) rotating the aspherical lens to said predetermined angles after said marked position is rotated 180 degrees from said predetermined starting angle;

y) storing a second additional set of coordinates of an image formed at each of said predetermined angles, said second additional sets of coordinates being designated as $X''_{1i}$, $Y''_{1i}$ where i ranging from 0 through n−1;

wherein said step e) further comprises additional steps of:

I) rotating the aspherical lens to predetermined angles after said marked position is initially positioned at said predetermined starting angle;

II) storing a third additional set of coordinates of an image formed at each of said predetermined angles, said third additional sets of coordinates being designated as $X'_{2i}$, $Y'_{2i}$ where i ranging from 0 through n−1;

III) rotating the aspherical lens to said predetermined angles after said marked position is rotated 180 degrees from said predetermined starting angle;

IV) storing a fourth additional set of coordinates of an image formed at each of said predetermined angles, said fourth additional sets of coordinates being designated as $X''_{2i}$, $Y''_{2i}$ where i ranging from 0 through n−1; and V) adjusting said eccentricity based upon said first additional sets, said second additional sets, said third additional sets and said fourth additional sets of said coordinates so as to substantially minimize an error component contributed by an misalignment between the holder and the image-forming optical subsystem.

19. The method of measuring eccentricity of an aspherical lens according to claim 18 wherein said step V) further comprises additional steps of:

VI) determining $X_{1i}=(X'_{1i}-X''_{1i})/2$ and $Y_{1i}=(Y'_{1i}-Y''_{1i})/2$ for every i from 0 to n−1; and VII) determining $X_{2i}=(X'_{2i}-X''_{2i})/2$ and $Y_{2i}=(Y'_{2i}-Y''_{2i})/2$ for every i from 0 to n−1.

20. The method of measuring eccentricity of an aspherical lens according to claim 19 wherein said step V) further comprises additional steps of:

VIII) determining a third distance T between $(X_{1i}, Y_{1i})$ and $(X_{2i}, Y_{2i})$ based upon said first distance designated by $\Delta R$ and a following relation:

$$T = \Sigma \sqrt{\begin{array}{l}[\{(X_{2i} - X_{C2}) - (R_0 - R_1 - t + \Delta R) \cdot (X_{1i} - X_{C1})/(R_0 - R_1 - t)\}^2 + \\ \{(Y_{2i} - Y_{C2}) - (R_0 - R_1 - t + \Delta R) \cdot (Y_{1i} - X_{Ci})/(R_0 - R_1 - t)\}^2]\end{array}}$$

where the above as well as the following averaged values are taken from 0 to n−1, $X_{c1}=(\Sigma X_{1i})/n$, $X_{C2}=(\Sigma X_{2i})/n$, $Y_{c1}=(\Sigma Y_{1i})/n$, $Y_{C2}=(\Sigma Y_{2i})/n$, $R_0$ is a first radius of the substantial aspherical portion of the aspherical lens surface whose eccentricity is to be determined, $R_1$ is a second radius of the substantial aspherical portion opposite to the aspherical lens surface, and t is a thickness of the aspherical lens; and IX) determining said eccentricity in a corrected shift amount radian θ" based upon a following relation:

$$\theta''=\sin^{-1}\{(f_1 \cdot T \cdot \gamma)/2 \cdot f_2 \Delta R\} \cdot 180 \cdot 60/\pi.$$

21. The method of measuring eccentricity of an aspherical lens according to claim 20 wherein said eccentricity is also determined in a corrected tilt amount φ" based upon a following relation:

$$\phi'' = (1/n)\Sigma \tan^{-1} [\{(Y_{2i} - Y_{C2}) - (R_0 - R_1 - t + \Delta R) \cdot (Y_{1i} - Y_{C1})/(R_0 - R_1 - t)\}/\{(X_{2i} - X_{C2}) - (R_0 - R_1 - t + \Delta R) \cdot (X_{1i} - X_{C1})/(R_0 - R_1 - t)\}].$$

22. The method of measuring eccentricity of an aspherical lens according to claim 1 wherein said steps b), c,) d) and e) are simultaneously performed.

23. The method of measuring eccentricity of an aspherical lens according to claim 1 wherein said steps b), c), d) and e) are sequentially performed.

24. The method of measuring eccentricity of an aspherical lens according to claim 1 wherein said eccentricity is determined in terms of a shift amount, the shift amount being an angle formed between said first optical axis and a light ray incident upon said predetermined portion of the aspherical portion.

25. The method of measuring eccentricity of an aspherical lens according to claim 24 wherein said eccentricity is determined in terms of a tilt amount, the tilt amount being a direction of said shift amount.

26. A method of measuring eccentricity of a plurality of aspherical lens surfaces in a lens assembly using an image-forming optical subsystem, each of said aspherical lens surfaces having a substantially spherical portion near a paraxial region and an aspherical region, comprising the steps of:

a) placing the lens assembly in a holder so that a first optical axis of a first aspherical lens surface is substantially in alignment with a predetermined central axis of the holder;

b) adjusting said first aspherical lens surface for aligning said first optical axis with a second optical axis of the image-forming optical subsystem;

c) forming a first image through a first predetermined location of said aspherical portion of said first aspherical lens surface using the image-forming optical subsystem;

d) storing a first set of coordinates of a center of said first image formed in said step c) rotating the aspherical lens assembly about said predetermined central axis of the holder to a predetermined set of angles; storing a first additional set of coordinates of said first image formed at each of said predetermined angles, said first additional sets of coordinates being designated as $X_{1i}$, $Y_{1i}$ where i ranges from 0 through n−1;

e) forming a second image through a second predetermined location of said aspherical portion of a second aspherical lens surface using the image-forming optical subsystem;

f) storing a second set of coordinates of a center of said second image formed in said step e), rotating the aspherical lens assembly about said predetermined central axis of the holder to said predetermined set of said angles, storing a second additional set of coordinates of said second image formed at each of said predetermined angles, said second additional sets of coordinates being designated as $X_{2i}$, $Y_{2i}$ where i ranges from 0 through n−1;

g) determining first eccentricity of said first aspherical lens surface and second eccentricity of said second aspherical lens surface based upon said first set and said second set of said coordinates stored in said steps d) and f), and h') of adjusting said eccentricity based upon said first additional sets and said second additional sets of said coordinates so as to substantially minimize an error component contributed by the placement of the aspherical lens assembly.

27. The method of measuring eccentricity of a plurality of aspherical lens surfaces according to claim 26 wherein the image-forming optical subsystem projects substantially parallel light rays towards the aspherical lens and includes a first object lens having a focal length $f_1$, a second lens having a focal length $f_2$, a CCD camera having a pixel size of γ.

28. The method of measuring eccentricity of a plurality of aspherical lens surfaces according to claim 27 wherein said step b) is performed by placing a focal point of the image-forming optical subsystem at a para-axial curvature center of the substantially spherical portion near the paraxial region.

29. The method of measuring eccentricity of a plurality of aspherical lens surfaces according to claim 28 wherein said step c) further comprises the steps of:

h) determining a first distance from said para-axial curvature center to an aspherical curvature center of said predetermined position of said aspherical portion; and i) placing said focal point of the image-forming optical subsystem at said aspherical curvature center.

30. The method of measuring eccentricity of a plurality of aspherical lens surfaces according to claim 29 wherein said first distance is designated by ΔR and is determined by $$\Delta R=\{1/Z'(H)\}H+Z(H)-R_0$$

where $R_0$ is a radius of the substantially spherical portion and Z'(H) is a derivative of Z(H), Z being a function of H expressing a surface of the aspherical lens surface, H being a constant specifying said predetermined location of said aspherical portion.

31. The method of measuring eccentricity of a plurality of aspherical lens surfaces according to claim 29 wherein said step i) is accomplished by moving the holder along said first optical axis by said first distance.

32. The method of measuring eccentricity of a plurality of aspherical lens surfaces according to claim 29 wherein said step i) is accomplished by moving along said second optical axis at least a part of the image-forming optical subsystem by said first distance.

33. The method of measuring eccentricity of a plurality of aspherical lens surfaces according to claim 30 wherein said step e) further comprises the steps of:
   j) determining a second distance between the first aspherical lens surface and a center of the object lens of the image-forming optical subsystem; and
   k) placing the first object lens and the first aspherical lens surface at said second distance apart.

34. The method of measuring eccentricity of a plurality of aspherical lens surfaces according to claim 33 wherein said second distance is designated by Z and is determined by $$Z = -R_a(R_b - t)/[n \cdot R_a + (1-n) \cdot (R_b - t)]$$

where $R_a$ is a radius of the substantially spherical portion of the first aspherical lens surface, $R_b$ being a radius of the substantially spherical portion of the second aspherical lens surface, n being a refraction index of the aspherical lens assembly, t being a thickness of between the first aspherical lens surface and the second aspherical lens surface.

35. The method of measuring eccentricity of a plurality of aspherical lens surfaces according to claim 33 wherein said step k) is accomplished by moving along said second optical axis the first object lens of the image-forming optical subsystem by said second distance.

36. The method of measuring eccentricity of a plurality of aspherical lens surfaces according to claim 33 wherein said step k) is accomplished by moving the holder along said first optical axis by said second distance.

37. The method of measuring eccentricity of a plurality of aspherical lens surfaces according to claim 34 wherein said step g) further comprises the steps of:
   l) determining a shift amount $\epsilon_b$ of said second eccentricity of said second aspherical lens surface based upon said second set of said coordinates designated by ($X_b$, $Y_b$) and the following relation:

$$\epsilon_b = \gamma \cdot \sqrt{(X_b^2 + Y_b^2)/(2\beta \cdot m \cdot \xi)}$$

where :$\beta = f_2/f_1$, m being a transmissivity magnification factor of the first aspherical lens surface, $\xi$ being a predetermined coefficient for determining a shift amount of the second aspherical lens surface; and
   m) determining a tilt amount of said second eccentricity of said second aspherical lens surface designated by $\theta_b$ based upon said second set of said coordinates designated by ($X_b$, $Y_b$) and the following relation:

$$\theta_b = \tan^{-1}(X_b/Y_b) \cdot 180/\pi.$$

38. The method of measuring eccentricity of a plurality of aspherical lens surfaces according to claim 37 wherein said step g) further comprises the steps of:
   n) preparing first intermediate values $\alpha_X$ and $\alpha_Y$ based upon the following relations:

$$\alpha_X = \sin^{-1}[\gamma \cdot X_b/\{2\beta \cdot m(R_b - R_a - t)\}]$$

$$\alpha_Y = \cos^{-1}[\gamma \cdot X_b/\{2\beta \cdot m(R_b - R_a - t)\}];$$

o) preparing second intermediate values $X_{a'}$ and $Y_{a'}$ based upon said first intermediate values $\alpha_X$ and $\alpha_Y$:

$$X_{a'} = \{\gamma/(2\beta)\} X_a \cdot \cos \alpha_X - \Delta R \cdot \sin \alpha_X$$

$$Y_{a'} = \{\gamma/(2\beta)\} Y_a \cdot \cos \alpha_Y - \Delta R \cdot \sin \alpha_Y;$$

p) determining a shift amount of said first eccentricity of said first aspherical lens surface designated by $\epsilon_a$ based upon said second intermediate values and the following relation:

$$\epsilon_a = \sin^{-1}\{\sqrt{(X_{a'}^2 + Y_{a'}^2)}/\Delta R\};$$

and
   q) determining a tilt amount of said first eccentricity of said first aspherical lens surface designated by $\epsilon_a$ based upon said second intermediate values and the following relation:

$$\theta_a = \tan^{-1}(Y_{a'}/X_{a'}) \cdot 180/\pi.$$

39. The method of measuring eccentricity of a plurality of aspherical lens surfaces according to claim 26 said steps c,) d), e) and f) are simultaneously performed.

40. The method of measuring eccentricity of a plurality of aspherical lens surfaces according to claim 26 said steps c,) d), e) and f) are sequentially performed.

41. A system for measuring eccentricity of an aspherical lens having a substantially spherical portion near a paraxial region and an aspherical portion, the aspherical lens having a first optical axis, comprising:
   a lens holder having a predetermined central axis for positioning the aspherical lens so that the first optical axis of the aspherical lens is substantially in alignment with the predetermined central axis of the holder;
   an image-forming optical portion located near said lens holder for forming an image through the aspherical lens, said image-forming optical portion having a second optical axis and being positioned with respect to said lens holder so that said second optical axis substantially coincides with said first optical axis;
   an optical distance controller for controlling an optical distance between said lens holder and said image-forming optical portion, a first distance allowing said image-forming optical portion to form a first image through the substantially spherical portion, a second distance allowing said image-forming optical portion to form a second image through a predetermined position in the aspherical portion of the aspherical lens; and
   an image-analysis portion for storing information related to said first image and said second image and determining eccentricity of the aspherical lens based upon said stored information.

42. The system for measuring eccentricity of an aspherical lens according to claim 41 wherein the aspherical lens converges light rays.

43. The system for measuring eccentricity of an aspherical lens according to claim 41 wherein the aspherical lens diverges light rays.

44. The system for measuring eccentricity of an aspherical lens according to claim 41 wherein the aspherical lens has a first lens surface and a second lens surface, at least one of said first lens surface and said second lens surface being aspherical.

45. The system for measuring eccentricity of an aspherical lens according to claim 41 wherein said lens holder further comprises an adjustment unit for moving the aspherical lens held in said holder in a predetermined direction.

46. The system for measuring eccentricity of an aspherical lens according to claim 41 wherein said image-forming optical portion further comprises a light source and at least one objective lens for projecting substantially parallel light rays towards the aspherical lens.

47. The system for measuring eccentricity of an aspherical lens according to claim 46 wherein said optical distance controller places a focal point of said objective lens at a para-axial curvature center of the substantially spherical portion of the aspherical lens at said first distance.

48. The system for measuring eccentricity of an aspherical lens according to claim 47 wherein said optical distance controller determines $\Delta R$ for said second distance and is determined by $$\Delta R = \{1/Z'(H)\}H + Z(H) - R_0$$

where $R_0$ is a radius of the substantially spherical portion, $Z'(H)$ being a derivative of $Z(H)$, $Z$ being a function expressing the aspherical lens surface, $H$ being a constant indicating said predetermined location of said aspherical portion.

49. The system for measuring eccentricity of an aspherical lens according to claim 47 wherein the image-forming optical portion further comprises a first lens having a first focal length of $f_1$, a second lens having a second focal length of $f_2$ and a CCD camera having a pixel size of $\gamma$.

50. The system for measuring eccentricity of an aspherical lens according to claim 49 wherein said image-analysis portion stores said information including said first set of coordinates defined as $(X_1, Y_1)$ for said first image and said second set of coordinates defined as $(X_2, Y_2)$ for said second image.

51. The system for measuring eccentricity of an aspherical lens according to claim 50 wherein said image-analysis portion determines said eccentricity in a shift amount radian $\theta$ based upon a following relation:

$$\theta = \sin^{-1}\{(f_1 \cdot D \cdot \gamma)/2 \cdot f_2 \cdot \Delta R)\} \cdot 180 \cdot 60/\pi$$

where a distance $D$ between $(X_1, Y_1)$ and $(X_2, Y_2)$ is determined based upon a following relation:

$$D = \sqrt{\begin{array}{l}[\{X_2 - (R_0 - R_1 - t + \Delta R) \cdot X_1/(R_0 - R_1 - t)\}^2 + \\ \{Y_2 - (R_0 - R_1 - t + \Delta R) \cdot Y_1/(R_0 - R_1 - t)\}^2]\end{array}}$$

where $R_0$ is a first radius of the substantially spherical region of the aspherical lens surface whose eccentricity is to be determined, $R_1$ being a second radius of said curvature opposite to the aspherical lens surface, $t$ being a thickness of the aspherical lens.

52. The system for measuring eccentricity of an aspherical lens according to claim 51 wherein said image-analysis portion determines said eccentricity in a tilt amount $\phi$ based upon a following relation:

$$\phi = \tan^{-1}[\{Y_2 - (R_0 - R_1 - t + \Delta R) \cdot Y_1/(R_0 - R_1 - t)\}/\{X_2 - (R_0 - R_1 - t + \Delta R) \cdot X_1/(R_0 - R_1 - t)\}].$$

53. The system for measuring eccentricity of an aspherical lens according to claim 41 wherein said optical distance controller moves said lens holder along said first optical axis.

54. The system for measuring eccentricity of an aspherical lens according to claim 41 wherein said optical distance controller moves at least a part of the image-forming optical portion along said second optical axis.

55. The system for measuring eccentricity of an, aspherical lens according to claim 41 wherein said optical distance controller further comprises a plurality of reticules located at various predetermined distances for forming a plurality of said images.

56. The system for measuring eccentricity of an aspherical lens according to claim 55 wherein said images are sequentially formed.

57. The system for measuring eccentricity of an aspherical lens according to claim 55 wherein said images are simultaneously formed.

58. The system for measuring eccentricity of an aspherical lens according to claim 41 wherein said eccentricity is determined in terms of a shift amount, the shift amount being an angle formed between said first optical axis and a light ray incident upon said predetermined portion of the aspherical portion.

59. The system for measuring eccentricity of an aspherical lens according to claim 41 wherein said eccentricity is determined in terms of a tilt amount, the tilt amount being a direction of said shift amount.

60. The system for measuring eccentricity of an aspherical lens according to claim 41 wherein said lens holder further comprises a rotation unit for rotating the aspherical lens about said predetermined central axis of said lens holder to a predetermined set of angles.

61. The system for measuring eccentricity of an aspherical lens according to claim 60 wherein said image-analysis portion stores a first additional set of coordinates of said first image formed at each of said predetermined angles, said first additional sets of coordinates being designated as $X_{1i}$, $Y_{1i}$ where i ranges from 0 through n−1, said image-analysis portion also storing a second additional set of coordinates of said second image formed at each of said predetermined angles, said second additional sets of coordinates being designated as $X_{2i}$, $Y_{2i}$ where i ranges from 0 through n−1, said image-analysis portion correcting said eccentricity based upon said first additional sets and said second additional sets of said coordinates so as to substantially minimize an error component contributed by the placement of the aspherical lens.

62. The system for measuring eccentricity of an aspherical lens according to claim 61 wherein said image-analysis portion determines said eccentricity in a corrected shift amount radian $\theta'$ based upon a following relation:

$$\theta' = \sin^{-1}\{(f_1 \cdot T \cdot \gamma)/2 \cdot f_2 \cdot \Delta R)\} \cdot 180 \cdot 60/\pi$$

where a third distance T between $(X_{1i}, Y_{1i})$ and $(X_{2i}, Y_{2i})$ is based upon $\Delta R$ and a following relation:

$$T_k = \Sigma \sqrt{\begin{array}{l}[\{(X_{2i} - X_{C2}) - (R_0 - R_1 - t + \Delta R) \cdot (X_{1i} - X_{C1})/(R_0 - R_1 - t)\}^2 + \\ \{(Y_{2i} - Y_{C2}) - (R_0 - R_1 - t + \Delta R) \cdot (Y_{1i} - X_{Ci})/(R_0 - R_1 - t)\}^2]\end{array}}$$

where the above as well as the following averaged values are taken from 0 to n−1, $X_{C1} = (\Sigma X_{1i})/n$, $X_{C2} = (\Sigma X_{2i})/n$, $Y_{C1} = (\Sigma Y_{1i})/n$, $Y_{C2} = (\Sigma Y_{2i})/n$, $R_0$ is a first radius of the substantially spherical portion of the aspherical lens surface whose eccentricity is to be determined, $R_1$ is a second radius of the substantially spherical portion opposite to the aspherical lens surface, and t is a thickness of the aspherical lens.

63. The system for measuring eccentricity of an aspherical lens according to claim 62 wherein said image-analysis portion also determines eccentricity in a corrected tilt amount φ' based upon a following relation:

$$\phi' = (1/n)\Sigma \tan^{-1}[\{(Y_{2i} - Y_{C2}) - (R_0 - R_1 - t + \Delta R) \cdot$$
$$(Y_{1i} - Y_{C1})/(R_0 - R_1 - t)\}/\{(X_{2i} - X_{C2}) -$$
$$(R_0 - R_1 - t + \Delta R) \cdot (X_{1i} - X_{C1})/(R_0 - R_1 - t)\}].$$

64. A system for measuring eccentricity of a plurality of aspherical lens surfaces in a lens assembly using an image-forming optical subsystem, each of said aspherical lens surfaces having a substantially spherical portion near a paraxial region and an aspherical region, comprising:
  a lens assembly holder having a predetermined central axis for placing the lens assembly in a holder so that a first optical axis of a first aspherical lens surface is substantially in alignment with the predetermined central axis of the holder;
  an image-forming optical portion located near said lens holder for forming an image through the aspherical lens, said image-forming optical portion having a second optical axis and being positioned with respect to said lens holder so that said second optical axis substantially coincides with said first optical axis;
  an optical distance controller for controlling an optical distance between said lens holder and said image-forming optical portion, a first distance allowing said image-forming optical portion to form a first image through a predetermined position in the aspherical portion of the first aspherical lens surface, a second distance allowing said image-forming optical portion to form a second image through a predetermined position in the aspherical portion of the second aspherical lens surface, a third distance allowing said image-forming optical portion to form a third image through the substantially spherical portion of the first aspherical lens surface; and
  an image-analysis portion operationally connected to said image-forming optical portion for receiving information related to said first image and said second image and determining eccentricity of the aspherical lens based upon said stored information.

65. The system for measuring eccentricity of a plurality of aspherical lens surfaces according to claim 64 wherein the image-forming optical portion projects substantially parallel light rays towards the aspherical lens and includes a first object lens having a focal length $f_1$, a second lens having a focal length $f_2$, a CCD camera having a pixel size of γ.

66. The system for measuring eccentricity of a plurality of aspherical lens surfaces according to claim 64 wherein said optical distance controller places a focal point of the image-forming optical portion at a para-axial curvature center of the substantially spherical portion of the first aspherical surface at said third distance.

67. The system for measuring eccentricity of a plurality of aspherical lens surfaces according to claim 64 wherein said optical distance controller determines said first distance ΔR based upon the following relation:

$$\Delta R = \{1/Z'(H)\}H + Z(H) - R_0$$

where $R_0$ is a radius of the substantially spherical portion and Z'(H) is a derivative of Z(H), Z being a function of H expressing a surface of the aspherical lens surface, H being a constant specifying said predetermined location of said aspherical portion.

68. The system for measuring eccentricity of a plurality of aspherical lens surfaces according to claim 64 wherein said optical distance controller moves said lens assembly holder along said first optical axis by said first distance.

69. The system for measuring eccentricity of a plurality of aspherical lens surfaces according to claim 64 wherein said optical distance controller moves along said second optical axis at least a part of said image-forming optical portion by said first distance.

70. The system for measuring eccentricity of a plurality of aspherical lens surfaces according to claim 64 wherein said optical distance controller determines said second distance which is designated by Z based upon $$Z = -R_a(R_b - t)/[n \cdot R_a + (1-n) \cdot (R_b - t)]$$

where $R_a$ is a radius of the substantially spherical portion of the first aspherical lens surface, $R_b$ being a radius of the substantially spherical portion of the second aspherical lens surface, n being a refraction index of the aspherical lens assembly, t being a thickness of between the first aspherical lens surface and the second aspherical lens surface.

71. The system for measuring eccentricity of a plurality of aspherical lens surfaces according to claim 70 wherein said optical distance controller moves along said second optical axis a portion of said image-forming optical portion by said second distance.

72. The system for measuring eccentricity of a plurality of aspherical lens surfaces according to claim 71 wherein said optical distance controller moves said lens assembly holder along said first optical axis by said second distance.

73. The system for measuring eccentricity of a plurality of aspherical lens surfaces according to claim 70 wherein said image-analysis portion stores information on said second image including a second set of said coordinates designated by $(X_b, Y_b)$.

74. The system for measuring eccentricity of a plurality of aspherical lens surfaces according to claim 73 wherein said image-analysis unit determines a shift amount $\epsilon_b$ of said second eccentricity of said second aspherical lens surface based upon $(X_b, Y_b)$ and the following relation:

$$\epsilon_b = \gamma \cdot \sqrt{(X_b^2 + Y_b^2)/(2\beta \cdot m \cdot \xi)}$$

where $\beta = f_2/f_1$, m being a transmissivity magnification factor of the first aspherical lens surface, ξ being a predetermined coefficient for determining a shift amount of the second aspherical lens surface.

75. The system for measuring eccentricity of a plurality of aspherical lens surfaces according to claim 74 wherein said image-analysis unit determines a tilt amount $\theta_b$ of said second eccentricity of said second aspherical lens surface based upon $(X_b, Y_b)$ and the following relation:

$$\theta_b = \tan^{-1}(X_b/Y_b) \cdot 180/\pi.$$

76. The system for measuring eccentricity of a plurality of aspherical lens surfaces according to claim 75 wherein said image-analysis unit determines a shift amount $\epsilon_a$ of said first eccentricity of said first aspherical lens surface based upon the following relation:

$$\epsilon_a = \sin^{-1}\{\sqrt{(X_a^2 + Y_a^2)}/\Delta R\}$$

where $$\alpha_X = \sin^{-1}[\gamma \cdot X_b/\{2\beta \cdot m(R_b - R_a - t)\}]$$

$$\alpha_Y = \cos^{-1}[\gamma \cdot X_b/\{2\beta \cdot m(R_b - R_a - t)\}]$$

$$X_a = \{\gamma/(2\beta)\}X_a \cdot \cos \alpha_X - \Delta R \cdot \sin \alpha_X$$

$$Y_{a'} = \{\gamma/(2\beta)\} Y_a \cdot \cos \alpha_Y - \Delta R \cdot \sin \alpha_Y.$$

77. The system for measuring eccentricity of a plurality of aspherical lens surfaces according to claim 76 wherein said image-analysis unit determines a tilt amount $\theta_a$ of said first eccentricity of said first aspherical lens surface based upon the following relation:

$$\theta_a = \tan^{-1}(Y_{a'}/X_{b'}) \cdot 180/\pi.$$

78. The system for measuring eccentricity of a plurality of aspherical lens surfaces according to claim 64 said optical distance controller further comprises a plurality of reticules located at various predetermined distances for forming a plurality of said images.

79. The system for measuring eccentricity of a plurality of aspherical lens surfaces according to claim 78 wherein said image-analysis unit simultaneously receives said images.

80. The system for measuring eccentricity of a plurality of aspherical lens surfaces according to claim 78 wherein said image-analysis unit sequentially receives said images.

81. The system for measuring eccentricity of a plurality of aspherical lens surfaces according to claim 64 wherein said lens assembly holder further comprises a rotation unit for rotating the aspherical lens assembly about said predetermined central axis of said lens assembly holder to a predetermined set of angles.

\* \* \* \* \*